US012770293B2

(12) United States Patent
Ahmed et al.

(10) Patent No.: US 12,770,293 B2
(45) Date of Patent: Oct. 20, 2026

(54) ALIGNING MULTIPLE COORDINATE SYSTEMS FOR INFORMATON MODEL RENDERING

(71) Applicant: XYZ REALITY LIMITED, London (GB)

(72) Inventors: Umar Ahmed, London (GB); David Mitchell, London (GB)

(73) Assignee: XYZ REALITY LIMITED, London (GB)

( * ) Notice: Subject to any disclaimer, the term of this patent is extended or adjusted under 35 U.S.C. 154(b) by 417 days.

(21) Appl. No.: 18/275,301

(22) PCT Filed: Feb. 3, 2022

(86) PCT No.: PCT/EP2022/052532
§ 371 (c)(1),
(2) Date: Aug. 1, 2023

(87) PCT Pub. No.: WO2022/167505
PCT Pub. Date: Aug. 11, 2022

(65) Prior Publication Data

US 2024/0087166 A1 Mar. 14, 2024

(30) Foreign Application Priority Data

Feb. 5, 2021 (GB) ...................................... 2101592

(51) Int. Cl.
*G06T 7/80* (2017.01)
*G06T 7/246* (2017.01)
*G06T 19/00* (2011.01)

(52) U.S. Cl.
CPC ................ *G06T 7/80* (2017.01); *G06T 7/246* (2017.01); *G06T 19/006* (2013.01)

(58) Field of Classification Search
CPC .......... G06T 7/80; G06T 7/246; G06T 19/006
See application file for complete search history.

(56) References Cited

U.S. PATENT DOCUMENTS 10,962,774 B2 * 3/2021 Cummings ........ G02B 27/0101
2016/0131761 A1 * 5/2016 Yates ...................... G01S 7/481 356/3.11

(Continued)

FOREIGN PATENT DOCUMENTS

EP 2354893 A1 * 8/2011 ........... G06F 3/0346
WO WO-2019048866 A1 * 3/2019 ............ G01S 19/42

OTHER PUBLICATIONS

International Search Report and Written Opinion for PCT/EP2022/052532 mailed Jun. 9, 2022, 11 pages.

(Continued)

*Primary Examiner* — Michelle M Koeth
(74) *Attorney, Agent, or Firm* — Rothwell, Figg, Ernst & Manbeck, P.C.

(57) ABSTRACT

Certain examples described herein provide a headset for use in construction at a construction site. The headset has an article of headwear, sensor devices for a plurality of positioning systems, a head-mounted display for displaying an augmented reality image of a building information model, and an electronic control system with at least one processor. The at least one processor is configured to obtain a set of transformations that map between the coordinate systems of the plurality of positioning systems. The at least one processor is configured to use the set of transformations and at least one calibrated transformation to convert between the coordinate system of a pose and an extrinsic coordinate system used by the building information model to render an augmented reality image of the building information model relative to the pose of the article of headwear on the head-mounted display.

19 Claims, 10 Drawing Sheets

(56) References Cited

U.S. PATENT DOCUMENTS

| | | | | |
|---|---|---|---|---|
| 2019/0347783 | A1* | 11/2019 | Salgian | G02B 27/017 |
| 2019/0388781 | A1* | 12/2019 | Taylor | A63F 13/42 |
| 2020/0286289 | A1* | 9/2020 | Mitchell | G01C 15/002 |
| 2021/0182639 | A1* | 6/2021 | Brent | G06F 3/147 |
| 2021/0318149 | A1* | 10/2021 | Chang | G01S 13/867 |
| 2022/0179056 | A1* | 6/2022 | Braley | G01S 17/93 |

OTHER PUBLICATIONS

Jiao, Y., et al., “Towards cloud augmented reality for construction application by BIM and SNS integration,” Automation in Construction, vol. 33, 2013, pp. 37-47.
Mulloni, A., et al., “Indoor navigation with mixed reality world-in-miniature views and sparse localization on mobile devices,” Institute for Computer Graphics and Vision, Graz University of Technology, Austria, Proceedings of the International Working Conference on Advanced Visual Interfaces, 2012, 4 pages.
Search Report and Written Opinion for GB2101592.0 dated Nov. 8, 2021, 9 pages.

* cited by examiner

ALIGNING MULTIPLE COORDINATE SYSTEMS FOR INFORMATON MODEL RENDERING

CROSS REFERENCE TO RELATED APPLICATION(S)

This application is a 35 U.S.C. § 371 National Stage of International Patent Application No. PCT/EP2022/052532, filed Feb. 3, 2022, which claims priority to United Kingdom Patent Application No. 2101592.0, filed Feb. 5, 2021, the disclosures of which are incorporated herein in their entirety by reference, and priority is claimed to each of the foregoing.

TECHNICAL BACKGROUND

The present invention relates to aligning multiple coordinate systems. Certain preferred embodiments of the present invention relate to tracking a headset on a construction site using multiple positioning systems so as to display a building information model (BIM). This allows a user wearing the headset to view a virtual or augmented reality image of the BIM aligned with the view of the construction site from the headset. Other embodiments relate more generally to the alignment of multiple coordinate systems, for example, when tracking an object using heterogeneous positioning systems.

BACKGROUND OF THE INVENTION

Erecting a structure or constructing a building on a construction site is a lengthy process. The process can be summarised as follows. First, a three-dimensional model, known as a Building Information Model (BIM), is produced by a designer or architect. The BIM model is typically defined in real world coordinates. The BIM model is then sent to a construction site, most commonly in the form of two-dimensional (2D) drawings or, in some cases, as a three-dimensional (3D) model on a computing device. An engineer, using a conventional stake out/set out device, establishes control points at known locations in the real-world coordinates on the site and uses the control points as a reference to mark out the location where each structure in the 2D drawings or BIM model is to be constructed. A builder then uses the drawings and/or BIM model in conjunction with the marks ("Set Out marks") made by the engineer to erect the structure according to the drawings or model in the correct place. Finally, an engineer must validate the structure or task carried out. This can be performed using a 3D laser scanner to capture a point-cloud from which a 3D model of the "as built" structure can be derived automatically. The "as built" model is then manually compared to the original BIM model. This process can take up to two weeks, after which any items that are found to be out of tolerance must be reviewed and may give rise to a penalty or must be re-done.

The above method of erecting a structure or constructing a building on a construction site has a number of problems. Each task to be carried out at a construction site must be accurately set out in this way. Typically, setting out must be done several times during a project as successive phases of the work may erase temporary markers. Further, once a task has been completed at a construction site, it is generally necessary to validate the task or check it has been done at the correct location. Often the crew at a construction site need to correctly interpret and work from a set of 2D drawings created from the BIM. This can lead to discrepancies between the built structure and the original design. Also set control points are often defined in relation to each other, meaning that errors chaotically cascade throughout the construction site. Often these negative effects interact over multiple layers of contractors, resulting in projects that are neither on time, within budget nor to the correct specification.

WO2019/048866 A1 (also published as EP3679321), which is incorporated by reference herein, describes a headset for use in displaying a virtual image of a building information model (BIM) in relation to a site coordinate system of a construction site. In one example, the headset comprises an article of headwear having one or more position-tracking sensors mounted thereon, augmented reality glasses incorporating at least one display, a display position tracking device for tracking movement of the display relative to at least one of the user's eyes and an electronic control system. The electronic control system is configured to convert a BIM defined in an extrinsic, real world coordinate system into an intrinsic coordinate system defined by a position tracking system, receive display position data from the display position device and headset tracking data from a headset tracking system and render a virtual image of the BIM relative to the position and orientation of the article of headwear on the construction site and relative position of the display relative to the user's eye and transmit the rendered virtual image to the display which is viewable by the user.

WO2019/048866 A1 describes how the headset may be tracked within a tracked volume defined by external sensors of the position tracking system. For example, a laser-based inside-out positional tracking system may comprise a plurality of spaced apart base stations, each of which is selectively operable to emit an omnidirectional synchronisation pulse of infrared light and comprises two rotors that are arranged to sweep two linear non-visible optical fan-shaped beams across the construction site on mutually orthogonal axes. In described examples, the base stations are separated from each other by a distance of up to about 5-10 m. Hence, examples of the position tracking system of WO2019/048866 A1 create tracked volumes that cover a typical area of between 5 and 10 $m^2$. These tracked volumes allow for high accuracy, e.g. an object may be located within 3 mm in each direction and preferred systems locate objects with 1 mm accuracy. This compares with other systems, such as Global Positioning System based positional tracking systems, that only have accuracies within 1-5 cm.

While the tracked volumes of WO2019/048866 A1 provide high accuracy that enable a virtual image of the BIM to be displayed to a user, e.g. as an augmented reality display, there is a problem of implementing this approach in larger construction sites. For example, WO2019/048866 A1 works well within an area of a single small building and/or a floor of a multi-floor structure but for a large multi-building housing project or the whole multi-floor structure multiple tracked volumes or an extensive beacon network may be required.

US 2016/292918 A1, incorporated by reference herein, describes a method and system for projecting a model at a construction site using a network-coupled hard hat. Cameras are connected to the hard hat and capture an image of a set of registration markers. A position of the user device is determined from the image and an orientation is determined from motion sensors. A BIM is downloaded and projected to a removable visor based on the position and orientation. US 2016/292918 A1 does not describe the use of external tracking devices that form part of a position tracking system located at a construction site.

U.S. Pat. No. 5,100,229 A, incorporated by reference herein, describes a spatial positioning apparatus providing three-dimensional position information. Methods utilize the position information for improved surveying, construction layout, equipment operations, manufacturing control and autonomous vehicle control. The spatial positioning apparatus includes at least three, preferably four, fixed referent stations. A minimum of two, preferably three, of the fixed stations sweeps a spread laser beam horizontally across the site of interest. The remaining fixed station sweeps a spread beam vertically across the site of interest. A strobe signal is emitted from each fixed station when the rotation mechanism actuates a rotation datum. The spatial positioning apparatus also includes one or more portable position sensors. The portable position sensor includes a light sensitive detector, a computer, and a display. The x, y, z coordinates of the portable position sensor are obtained through a triangulation technique based on time marks received from each spread laser beam from the fixed stations and the rotation datum received from the strobe of each fixed station. Multiple portable position sensors for use in attitude information for productivity improvement for equipment and for control of autonomous vehicles are disclosed.

In general, when using augmented reality systems that correlate data relating to an object (e.g., in the form of an information model like the BIM) with the tracking of the object (e.g., the object's pose: its location and orientation within an environment), there is a problem of providing robust and accurate tracking, and of then matching this to the object data. Different positioning systems that provide tracking data have different advantages and disadvantages and there is no "perfect" system. Typically, engineers select a positioning system that is most appropriate for an implementation. However, this often leads to independent bespoke heterogeneous systems, where it is difficult to reuse configurations between implementations. This also often leads to individual "hot-fixes" and tailored configurations at each install site, further compounding inoperability.

There is thus a specific challenge of operating an augmented reality solution for BIM display at larger, more complex construction sites, and a more general challenge of providing robust and accurate information model display in augmented reality solutions, especially in variable environments over larger geographical areas.

A first paper "Towards cloud Augmented Reality for construction application by BIM and SNS integration" by Yi Jiao et al, as published in Automation in Construction, vol. 33, 1 Aug. 2013, pages 37-47, describes a video-based on-line AR environment and a pilot cloud framework for a construction AR system. An environment utilizing web3D is demonstrated, in which on-site images as acquired with an iPad® are rendered to box nodes and registered with virtual objects through a three-step method (see abstract). These three steps involve: 1) an automatic initial registration to align the (box node) image and the virtual objects; 2) an automatic mapping of the first step in x3d (an XML-based file format that is part of an open standard for publishing, viewing, printing and archiving interactive 3D models on the Internet); and 3) an additional manual fine registration to provide optimal alignment (see section 4.2—Registration and tracking). It is noted in section 7 (Conclusions and future work) that accuracy is provided by the third step. This is onerous for a practical solution for dynamic augmented reality on a construction site as it requires the surveyor, engineer, or construction worker to manually align the virtual objects from the BIM with any acquired image of the site. Indeed, this somewhat defeats the prime function of an easy-to-use augmented reality solution for BIM display. Moreover, the paper describes a single tracking module that uses images acquired on-site using the iPad®. Localization of the iPad is performed using a method described in the paper "Multiple planes based registration using 3D projective space for Augmented Reality" by Y. Uematsu et al, published in Image and Vision Computing 27 (2009). In this method, two reference images are used that capture the same real-world scene from two different viewpoints. Planes within these images are identified, and projections from these planes to the input images are computed. Using these projections, a set of transformations from the planes to a "projective space" is determined. The projection space is a 3D non-Euclidean coordinate system. A transformation from the projection space to input images is computed and is used to project virtual objects to captured images to generate an augmented reality view.

A second paper "Indoor navigation with mixed reality world-in-miniature views and sparse localization on mobile devices" by Alessandro Mulloni et al, as published in Proceedings of the International Working Conference on Advanced Visual Interfaces, AVI '12, 1 Jan. 2012, pages 212-215, describes an interface that provides continuous navigational support for indoor scenarios where localization is only available at sparse, discrete locations (info points). In the described example, a user navigates an interior of a building using a mobile device (in particular, an iPhone® 4). In this example, an info point comprises a poster on the floor at set points within a building. The poster contains a pattern that can be detected and tracked using computer vision technology and a unique identifier is also encoded into a central part of the poster (see section 3.1—Info points). In the paper, a "World-in-Miniature" (WIM) is provided in the form of a 2D or 3D map of the building (depending on the map view). At the info points, localization within the WIM is available (via the computer-readable pattern) and an augmented reality view may be displayed. Between info points, localization is not available and so a virtual reality view that only details a current navigation instruction is shown; an augmented reality view is not available as there is no way to align the virtual reality model (the WIM) with the mobile device, as the location of the mobile device is not known. In this non-tracked virtual-reality view, a user steps through a set of predefined navigation instructions. For example, a set of predefined turns and navigation steps are illustrated with respect to the WIM but these are not "live", rather they are replayed. The user is assumed to be on the path segment related to the current instruction (see section 3.2.2 MR view). While suitable for navigation within an office or shopping mall, the approach described in the paper is not suitable for the high-accuracy dynamic augmented reality that is desired in construction applications, e.g. a headset augmented reality application that allows construction to be accurately compared to a digital model.

The solution of the first paper has the problems of practical utility and accuracy. The solution therein is based around acquiring static images of a construction site with a tablet device and then displaying augmented information over those images. As the authors of the first paper state, the accuracy of the initial "automatic" registration is typically not good enough for construction uses, and users need to perform manual alignment to provide suitable accuracy. Such a solution is not practical for a real-time augmented reality, e.g. as displayed in a headset where a user can move around the construction site. As the first paper only uses a single tracking method, that based on detecting multiple planes in reference images, the first paper further provides no suggestion on how to address the problem of multiple positioning systems, instead it uses a single positioning method.

The solution of the second paper does not provide guidance to solve the problems experienced by the solution of the first paper. It too has very limited accuracy as it is designed for navigating large buildings rather than augmented display for validation within construction tolerances. A mobile device is only located at singular "info points" using a common positioning method (computer vision detection of floor patterns). There is no tracking of the mobile device between info points and thus augmented views cannot be displayed between info points. This solution thus shares some of the problems of US 2016/292918 A1, lacking flexibility for dynamic validation and augmented reality checking against a BIM. Once a user moves away from the info points, there is the potential for large deviations between the displayed "World-in-Miniature" and the real-world as viewed from a headset. Like the first paper, the solution of the second paper also provides no suggestion on how to address the problem of multiple positioning systems, as it only uses a single positioning method.

There is thus still a problem of how to provide an augmented reality solution for BIM display while dynamically navigating or exploring larger, more complex construction sites, e.g. where there may be multiple areas and/or positioning system technologies.

SUMMARY OF THE INVENTION

According to a first aspect of the present invention, there is provided a method of displaying an augmented reality building information model within a head-mounted display of a headset on a construction site, the method comprising: tracking the headset using a plurality of positioning systems, each positioning system having a corresponding coordinate system and comprising one or more sensor devices coupled to the headset, each positioning system determining a location and orientation of the headset over time within the corresponding coordinate system; obtaining a set of transformations that map between the co-ordinate systems of the plurality positioning systems; obtaining at least one calibrated transformation that maps between at least one of the co-ordinate systems of the plurality of positioning systems and an extrinsic coordinate system used by the building information model; obtaining a pose of the headset using positioning systems, the pose of the headset being defined within the co-ordinate system of the positioning systems, the pose of the headset comprising a location and orientation of the headset; and, using the set of transformations and the at least one calibrated transformation, converting between the co-ordinate system of the pose and the extrinsic co-ordinate system used by the building information model and rendering an augmented reality image of the building information model within the head-mounted display.

In certain cases, the method of the first aspect further comprises transitioning the tracking of the headset between the plurality of positioning systems, wherein a first of the plurality of positioning systems tracks a first pose of the headset and a second of the plurality of positioning systems tracks a second pose of the headset, wherein the at least one calibrated transformation is used to align the building information model with at least one of the poses to render the augmented reality image, and wherein one of the set of transformations is used to align the co-ordinate systems of the plurality of positioning systems. This may further comprise transitioning the tracking of the headset between different ones of the plurality of positioning systems, wherein a first of the different ones tracks a first pose of the headset at a first set of locations over time and a second of the different ones tracks a second pose of the headset at a second set of locations over time, wherein the at least one calibrated transformation is used to align the building information model with the first and second poses to render the augmented reality image, and wherein one of the set of transformations is used to align the coordinate systems of the different ones of the plurality of positioning systems for application of the at least one calibrated transformation.

The first aspect of the present invention overcomes the disadvantages of having to choose one positioning system for a construction site. For example, the low-range constraints of high-accuracy positioning systems may be overcome by using higher range yet lower accuracy positioning systems in parts of the construction site that are not suitable for coverage with the high-accuracy positioning systems, wherein interoperability is possible as coordinate systems for multiple different positioning systems are mapped to each other using defined transformations. The first aspect further allows calibration with respect to an extrinsic or real-world coordinate system to be performed for one of a plurality of positioning systems and then effectively re-used across the rest of the plurality of positioning systems as points may be mapped between the coordinate systems using the set of transformations. This also goes against the conventional approach in the art of designing ever-more-complex single technology positioning systems and allows the combination of heterogeneous positioning systems. A construction engineer faced with the problem of covering a larger construction site is typically taught by comparative solutions to just duplicate a preferred solution or add more tracking devices. They would not be motivated to combine multiple positioning systems as this is traditionally seen as extremely hard or impossible.

With regard to the first paper discussed above, the solution in that paper does not provide a plurality of positioning systems where each positioning system has a corresponding coordinate system and determines a location and orientation of the headset over time within said coordinate system. Instead, a single tracking module is provided where multiple reference images of a locations need to be acquired to compute a mapping from a projective space to an input image. The mapping is then used to project virtual objects onto an input image to provide an augmented reality view. The mapping to projective space is computed by first assigning 3D coordinate systems to detected planes within the reference images. These 3D coordinate systems are not positioning systems as described herein as they do not track the pose (i.e., location and orientation) of the headset over time. Indeed, the solution of the first paper is designed for augmented reality display of a single static scene and is ill-suited to free movement around an environment such as a construction site. None of the documents cited above in the background teach both the obtaining of a transformation to map between positioning system coordinate systems, e.g. so as to use a common or agreed tracking coordinate space, and a calibrated transformation to map between a determined pose and the extrinsic co-ordinate system used by the building information model, e.g. to map between a location and orientation in the common or agreed tracking coordinate space and the extrinsic co-ordinate system. The calibrated transformation thus allows for high accuracy alignment with the building information model and the positioning-system transformation allows for compatibility between positioning systems and allows the application of the calibrated transformation to all positioning systems, regardless of the original positioning system used for the calibration.

In certain examples, the plurality of positioning systems comprise at least a first positioning system with a first co-ordinate system and a second positioning system with a second co-ordinate system. In this case, transitioning the tracking of the headset between different ones of the plurality of positioning systems may further comprise: tracking the headset over time with the first positioning system, including performing a first mapping between a first pose in the first co-ordinate system and the extrinsic co-ordinate system used by the building information model using the at least one calibrated transformation; rendering an augmented reality image of the building information model within the head-mounted display using the first mapping; transitioning to tracking the headset over time with the second positioning system, including performing a second mapping between a second pose in the second co-ordinate system and the extrinsic co-ordinate system used by the building information model; and rendering an augmented reality image of the building information model within the head-mounted display using the second mapping, wherein the second mapping uses one of the set of transformations to map between the first and second co-ordinate systems and the at least one calibrated transformation to align the location and orientation of the headset with the extrinsic coordinate system. Hence, in this case there may be seamless or transparent hand-over between different positioning systems from the point of view of the user viewing the augmented reality image within the display of the headset. This means that a user is able to walk between different locations where different positioning system are active without losing the high accuracy alignment of the building information model with their view. This, for example, is not possible in the second paper discussed above, where augmented reality views are only possible at the info points meaning a user is not able to view an augmented reality image while the user navigates between info points.

In certain examples, the first positioning system within the plurality of positioning systems is configured to track the headset within a tracked volume using one or more position-tracking sensors at least coupled to the headset and one or more tracking devices for the tracked volume that are external to the headset within the construction site, wherein the at least one calibrated transformation is determined using sensor data obtained at control points for the first positioning system. For example, the first positioning system may comprise a laser inside-out position tracking system using orthogonal swept beams that are detected by photodiodes on a helmet of the headset or an optical marker tracking system that tracks active or passive markers on the helmet with a plurality of cameras that cover the tracked volume. In certain examples, the method comprises determining a first pose of the headset using the aforementioned first positioning system; converting between the coordinate system for the first positioning system and the extrinsic coordinate system used by the building information model using the at least one calibrated transformation and rendering a virtual image of the building information model within the head-mounted display relative to the first pose of the headset; responsive to a determination that the headset is not tracked by the first positioning system, determining a second pose of the headset using a second positioning system within the within the plurality positioning systems, the second positioning system being configured to track the headset using one or more camera devices at least coupled to the headset; converting between the coordinate system for the second positioning system and the extrinsic coordinate system used by the building information model using the set of transformations and the at least one calibrated transformation; and rendering a virtual image of the building information model within the head-mounted display relative to the second pose of the headset.

This differs from a comparative process where a user is able to work within a tracked volume of the first positioning system but then needs to shut down and restart the headset to work in another tracked volume. For example, the inventors have found that the comparative approach is to duplicate tracked volumes or to add more external tracking devices to enlarge the range of a high-accuracy positioning system that is needed to accurately display a BIM within a head-mounted display of the headset. However, duplicating and extending the tracked volumes of a first positioning system leads to many problems. Firstly, the headset needs to be shut down and re-activated when moving between volumes—it can thus take around 15 minutes to get a headset back up and running when moving between even neighbouring tracked volumes. Secondly, extending tracked volumes and adding more volumes or external tracking devices in a comparative manner exponentially increases complexity. For this reason, most manufacturers only support single volume implementations. Furthermore, even when positioning systems support multiple tracked volumes, the inventors have found inherent limitations to the number of external tracking devices for any one positioning system. For example, it has been found that high-accuracy swept beam or tracked marker technologies are limited to around 16 external tracking devices, and even these systems are difficult to implement in practice. This means that the number of tracked volumes is often severely limited in practice, which may be problematic for large-scale and multi-location construction sites. In contrast, the present invention, by mapping between the coordinate systems of multiple positioning systems, and using at least one calibrated transform, allows unlimited extendibility by combining different positioning systems and avoids the need for lengthy booting and calibration processes when moving between tracked volumes.

In certain examples, one or more tracking devices for the tracked volume form a first set of tracking devices located at a first location within the construction site, the first set of tracking devices defining or implementing a first tracked volume. In this case, the construction site may further comprise a second location that is geographically separated from the first location, the second location comprising a second set of tracking devices defining or implementing a second tracked volume (i.e., the tracking devices being used to track the headset within the tracked volume). In this scenario, the method may comprise rendering the augmented reality image of the building information model within the head-mounted display relative to the second pose of the headset during movement of the headset between the first and second locations of the construction site.

Hence, in this particular case, a second positioning system may be used to "join" two tracked volumes for separate areas of a construction site. The method allows for seamless handover between the positioning systems as each positioning system is continuously or periodically reconciled (or at least is reconcilable) via the set of transformations, which may act to map origins of each of the positioning systems to each other, and thus allow points and/or other geometric structures represented in one intrinsic coordinate system of one positioning system to be represented in another intrinsic coordinate system of another positioning system. The construction engineer may not see the setup times as a feature that may be improved (e.g., these may just be seen as part of the tracking system). Even faced with a problem of long setup times when moving between tracked volumes, the construction engineer would typically look at speeding up the boot of the device within the tracked volumes rather than adding additional differing positioning systems.

In one case, responsive to entering the second tracked volume, a third pose of the headset is determined using signals received from the second set of tracking devices and the method comprises converting between the coordinate system for the first positioning system and the extrinsic coordinate system used by the building information model using one or more of: the at least one calibrated transformation, and a further transformation calibrated using sensor data obtained at control points within the second tracked volume for the first positioning system; wherein an augmented reality image of the building information model is rendered within the head-mounted display relative to the third pose of the headset.

The above example thus allows flexible handover of tracking between positioning systems, with the ability to either calibrate location within a second tracked volume using a calibrated transformation for a first tracked volume, and thus avoiding the need for additional point calibration, and/or using a calibrated transformation for the second tracked volume, where the latter may be used to enhance the accuracy following tracking by the second positioning system. Indeed, the present examples also allow use of multiple calibrated transformations for each tracked volume in a flexible and modular manner, such that if a calibrated transformation is available it may be used to enhance accuracy, but calibrated transformations for all positioning systems are not required (as would be the case for comparative implementations with multiple tracked volumes).

In certain examples, the method further comprises: determining that the headset is no longer being tracked by a first positioning system within the plurality of positioning systems; and responsive to a determination that the headset is no longer being tracked by the first positioning system, rendering the augmented reality image of the building information model within the head-mounted display relative to a pose of the headset as determined using a second positioning system within the plurality of positioning systems.

In this way, using the approaches of the first aspect, multiple positioning systems may be used to complement each other, and provide seamless back-up and fall-over tracking if one positioning system experiences tracking errors or sensor malfunction. This is particularly useful in a construction site that differs from the relatively controlled and clean environments of film and game studios that many high-accuracy positioning systems are designed for. Furthermore, even state of the art camera tracking systems, such as those set out in academic papers, are tested in interior office environments, and often fail to operate successfully in the dirty and more chaotic construction environments. The present aspect helps to address this by leveraging the strengths of heterogeneous positioning systems in a synergistic combination to provide a robust tracking system for the headset to allow reliable display of the BIM within a head-mounted display. The present aspect also differs from a naïve combination of two positioning systems that are used separately, e.g. even if two positioning systems were contemplated, the construction engineer would start by separately calibrating the coordinate systems of each positioning system and separately mapping each to the extrinsic coordinate system of the BIM. This, however, leads to problems of separate drift and misalignment of the coordinate systems. For example, at a switch over from one positioning system to another the BIM may appear to "jump" positions within the head-mounted display due to the separate tracking in each coordinate system. The wearer of the headset thus has the problem of working out correct positioning. This is another reason why the construction engineer would typically avoid multiple positioning systems as a solution; use of multiple positioning systems naively combined can easily result in more errors than a single technology positioning system, leading to low adoption and mistrust from users. However, the present aspects use multiple positioning systems where positions and orientations in each coordinate system of each positioning system may be mapped between different coordinate systems to ensure alignment, and the set of positioning systems may be able to use a single calibrated transformation to the extrinsic coordinate system of the BIM or multiple calibrated transformations that are mapped to a common coordinate system to ensure accurate alignment.

In one example, the positioning systems in the plurality of positioning systems have different ranges and accuracies and include at least a first positioning system with a first range and a first accuracy, and a second positioning system with a second range and a second accuracy, the first range being less than the second range and the first accuracy being greater than the second accuracy. For example, the first positioning system may comprise a high accuracy tracked volume system and the second positioning system may comprise a relatively lower accuracy simultaneous location and mapping (SLAM) system that receives image data from one or more camera devices. High accuracy may correspond to a millimetre or sub-millimetre accuracy (e.g., 0.1-3 mm) and low accuracy may correspond to a multi-millimetre accuracy (e.g., around 12 mm). The second positioning system may thus be used to cover a larger portion of the construction site and allow for both support tracking within high accuracy, low range zones and tracking between zones.

Although the second positioning system is lower accuracy it is still able to leverage the calibration of the first positioning system via the at least one calibrated transformation and the set of transformations, e.g. in the latter case via at least one transformation from a second coordinate system of the second positioning system to a first coordinate system of the first positioning system and a calibrated transformation between the first coordinate system and an extrinsic coordinate system of the BIM. This can boost the accuracy of the second positioning system. Even if the second positioning system operates at a lower accuracy outside of the tracked volumes, this is typically suitable for aligning the BIM, e.g. 10-20 mm accuracy may be suitable for exterior portions of a building and/or areas that do not have high detail finishes. Moreover, SLAM systems with multi-millimetre accuracy may suffer from tracking issues with large scale features (e.g., as found outdoors) and lighting changes (e.g., entering or existing a building). The present examples allow these issues to be addressed by using additional positioning system, e.g. corrections to the SLAM tracking may be applied automatically via the mapping when entering a tracked volume, and entering a tracked volume may correspond to a change that the SLAM system traditionally struggles with.

In one case, one or more tracking devices of the first positioning system emit one or more electromagnetic signals, and at least one of the one or more position-tracking sensors is configured to determine a property of the electromagnetic signals that is indicative of an angular distance from the one or more tracking devices.

In one case, the method may comprise calibrating at least the calibrated transformation. This may comprise, prior to tracking the headset, calibrating a tracked volume of a first positioning system in the plurality of positioning systems, including: receiving control point location data representing the positions of a plurality of control points at the construction site in the extrinsic coordinate system; receiving control point tracking data representing the positions of the control points in an intrinsic coordinate system used by the first positioning system; and relating the positions of the control points in the intrinsic and extrinsic coordinate systems to derive the at least one calibrated transformation, wherein the set of transformations map between the intrinsic co-ordinate system used by the first positioning system and one or more intrinsic coordinate systems used by other positioning systems within the plurality of positioning systems. In this manner, points that have representations in multiple different coordinate systems may be reconciled by way of a determined mathematical transformation that operates, say, on the origins of the coordinate systems. This calibrating may be repeated for a plurality of tracked volumes of the first positioning system, the plurality of tracked volumes relating to different zones of the construction site, and wherein the calibrating derives a plurality of transformations for each of the plurality of tracked volumes. In other cases, it may be performed a number of times that is less than the number of tracked volumes, e.g. to allow reuse of calibration across two or more tracked volumes. Each transformation may comprise a multi-dimensional array having rotation and translation terms, such as a 4 by 4 transformation matrix comprise a rotation sub-matrix and a translation vector that may be applied to an extended 3 by 1 vector (i.e., a 4 by 1 vector created by adding a bias element of 1) to map points and other geometric structures between coordinate systems.

In one case, the method may comprise determining a first set of points in the extrinsic coordinate system by applying the at least one calibrated transformation to a set of points in a coordinate system for a first positioning system within the plurality of positioning systems; determining a second set of points in the extrinsic coordinate system determined by applying the at least one calibrated transformation and one of the set of transformations to a set of points in a coordinate system for a second positioning system within the plurality of positioning systems; and fusing the two sets of points in the extrinsic co-ordinate system to determine a single set of points in the extrinsic co-ordinate system for the rendering of the building information model. For example, transformations may be cascaded to map to a common coordinate system. Fusion of sets of points may comprise computing a weighted average of point location based on accuracy and/or calibrating the set of transformations to minimise a different between defined points within the construction site that are measured by multiple positioning systems.

In one case, the method may comprise measuring a position of one or more defined points with each of the plurality of positioning systems; and comparing the measured positions to calibrate the set of transformations. The comparison may comprise optimising a non-linear function representing a difference between positions of the one or more defined points derived from two or more coordinate systems of two or more different positioning systems (e.g., positions of these points when mapped to a common frame of reference). This calibration may be performed once to determine a set of static transformations or may be performed iteratively, e.g. during use, to dynamically update the set of transformations to account for changes during use. The one or more defined points may comprise control points within the construction site, such as markers, posts, or building features that have a defined location in the extrinsic, real-world as represented by the BIM, or may comprise any points in the space that may be compared by considering a photometric error, e.g. an error between images projected from different point sets that are mapped to a common coordinate system. By presenting calibration as a non-linear optimisation problem, modern optimisation approaches may be used to determine the transformations, including those conventionally used for training neural networks (e.g., stochastic gradient descent methods and the like). This then allows for computationally efficient, off-the-shelf computing libraries, tools, and chipsets to be incorporated to allow for real-time operation. This is an unusual approach that uses techniques from different fields in a new manner.

In certain examples, the plurality of positioning systems includes at least two selected from the non-limiting list of: a radio-frequency identifier (RFID) tracking system comprising at least one RFID sensor coupled to the headset; an inside-out positioning system comprising one or more signal-emitting beacon devices external to the headset and one or more receiving sensors coupled to the headset; a global positioning system; a positioning system implemented using a wireless network and one or more network receivers coupled to the headset; and a camera-based simultaneous location and mapping (SLAM) system. An advantage of the present invention is that it may flexibly incorporate any positioning system than outputs position within its own coordinate system; the present invention provides the glue to join typically inoperable positioning systems that apply their own bespoke adjustment and calibration. In this manner, the headset may be continually updated and enhanced as new positioning systems become available without needing to change the fundamental system design.

According to a second aspect there is provided a headset for use in construction at a construction site, the headset comprising: an article of headwear; sensor devices for a plurality of positioning systems, each positioning system having a corresponding coordinate system, each positioning system determining a location and orientation of the headset over time within the corresponding coordinate system; a head-mounted display for displaying a virtual image of a building information model; and an electronic control system comprising at least one processor to: obtain a set of transformations that map between the coordinate systems of the plurality of positioning systems; obtain at least one calibrated transformation that maps between at least one of the coordinate systems of the plurality of positioning systems and an extrinsic coordinate system used by the building information model; obtain a pose of the headset using one of the plurality of positioning systems, the pose of the headset being defined within the coordinate system of the one of the plurality of positioning systems, the pose of the headset comprising a location and orientation of the headset; and use the set of transformations and the at least one calibrated transformation to convert between the coordinate system of the pose and the extrinsic coordinate system used by the building information model to render an augmented reality image of the building information model relative to the pose of the article of headwear on the head-mounted display.

The second aspect may thus provide the advantages discussed above with reference to the first aspect. As for the first aspect, the electronic control system may be configured to transition a tracking of the headset between the plurality of positioning systems, wherein a first of the plurality of positioning systems tracks a first pose of the headset and a second of the plurality of positioning systems tracks a second pose of the headset, wherein the at least one calibrated transformation is used to align the building information model with at least one of the poses to render the augmented reality image, and wherein one of the set of transformations is used to align the co-ordinate systems of the plurality of positioning systems In certain cases, the headset comprises one or more position-tracking sensors mounted in relation to the article of headwear that are responsive to one or more electromagnetic signals emitted by a first positioning system within the plurality of positioning systems, the first positioning system comprising one or more tracking devices for implementing a tracked volume that are external to the headset within the construction site; and one or more camera devices mounted in relation to the article of headwear to generate data for use by a second image-based positioning system within the plurality of positioning systems. In certain cases, the accuracy of the first positioning system is higher than the accuracy of the second positioning system.

Starting from a headset adapted with sensor devices for one high accuracy positioning system it is not obvious to extend this with sensor devices for other positioning systems, especially those that comprise image-based methods. For example, comparative systems teach one approach and typically require bespoke configuration to allow high accuracy in demanding environments, which teaches away from combining multiple positioning systems. Indeed, often this is seen in the art as impossible and so is not considered a practical solution. Mixing high and low accuracy systems as described herein also does not make sense unless a further mechanism is provided to reconcile the two, and there is no off-the-shelf system available to do this. In contrast, in the present aspects, transformations are used to map between coordinate systems of both positioning systems and the BIM, wherein one calibrated transformation may be used to allow quick setup and high accuracy across the plurality of positioning systems.

In one example, the electronic control system comprises one or more of: a first network interface for the first positioning system, the first network interface being configured to transmit sensor data derived from the one or more position-tracking sensors and receive data useable to derive a pose of the article of headwear determined by the first positioning system; and a second network interface for the second positioning system, the second network interface being configured to transmit sensor data derived from the one or more camera devices and receive data useable to derive a pose of the article of headwear determined based on said sensor data. In general, computing processes may be flexibly distributed across different computing devices. For example, image data may be transmitted to a remote server (the so-called "cloud") to perform remote localisation and mapping with positioning data being returned via the network interfaces. The first and second network interfaces may comprise separate interfaces or a common interface (such as a common wireless interface for the headset). In certain cases, some positioning systems may be implemented locally, and other positioning systems may be distributed (e.g., only one of the first and second network interfaces may be provided). Flexible configurations are possible.

The article of headwear may comprise a hard-hat.

In a third aspect of the present invention, there is a non-transitory computer-readable storage medium storing instructions which, when executed by at least one processor, cause the at least one processor to perform the method of the first aspect, or any of the variations, set out above.

BRIEF DESCRIPTION OF THE DRAWINGS

Examples of the invention will now be described, by way of example only, with reference to the accompanying drawings, in which.

DETAILED DESCRIPTION

Introduction

Figure 1A:
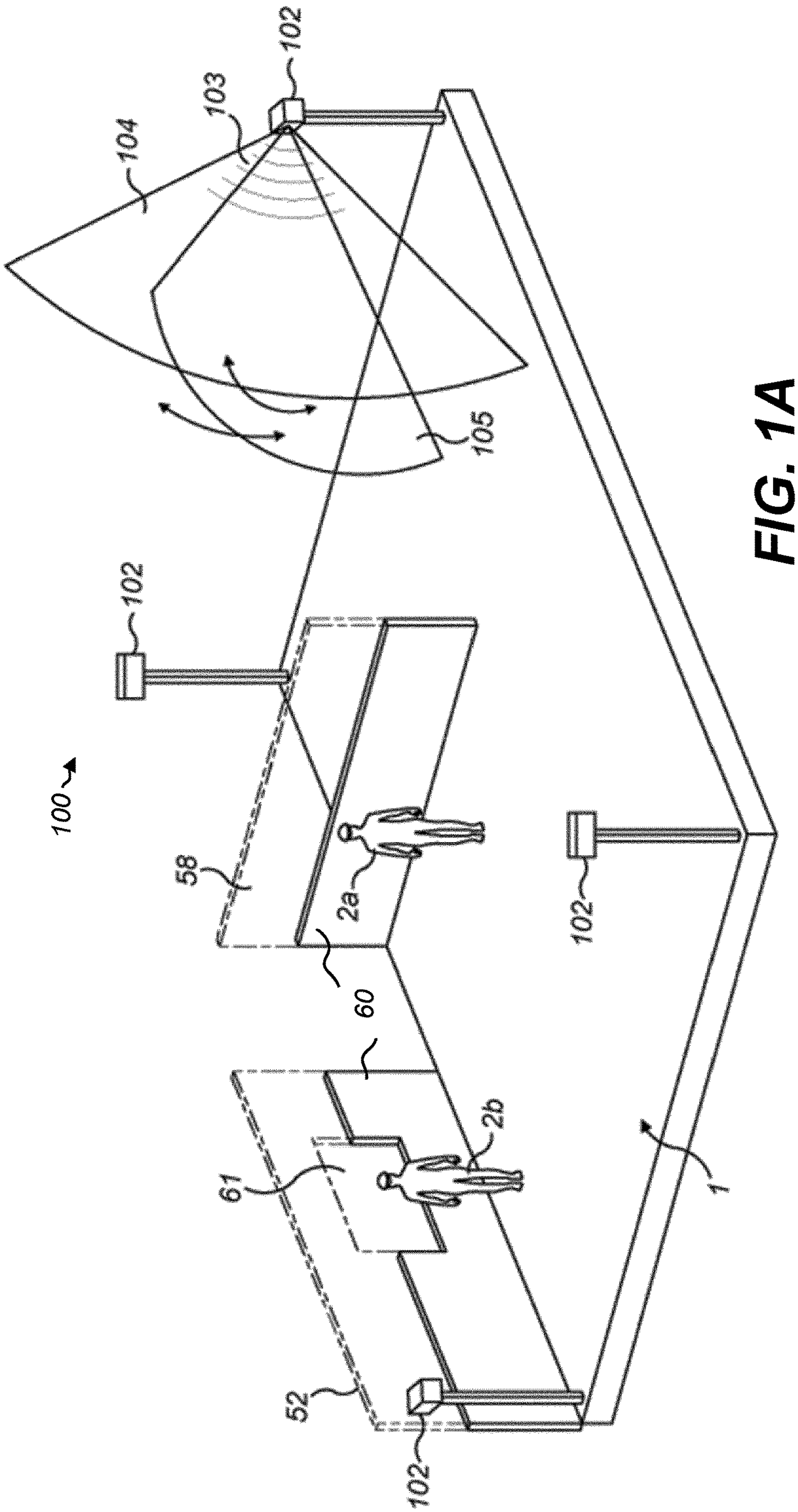
FIG. 1A is a schematic illustration of a first positioning system in use at a construction site.

The present invention provides approaches for aligning multiple coordinate systems from different positioning systems. This is a traditionally hard problem within the art of tracking systems and may be seen as part of the wider challenge of sensor fusion—combining data from multiple sensor systems. The challenge is especially acute within the nascent field of positioning systems for information display at construction sites. In many, if not all, cases, a solution has been to avoid the problem altogether, and just implement closed single-sensor-type positioning systems that track position and orientation as a "black box" function. In many cases, implementing a positioning solution involves choosing one "black box" solution from a handful of available systems, where the choice is dictated by implementation requirements such as range, accuracy, and cost. Those skilled in the art are taught away from combining different off-the-shelf solutions, as this is not deemed to be possible.

Working within three-dimensional space is also particularly challenging. Errors can be introduced in each of the three dimensions for point location and object orientation often requires an additional normal vector to define at least one plane where the dot product introduces multiplication terms that can magnify errors in each of six degrees of freedom. Tracking for the display of real-time information also involves high-frequency sampling. In this context, problems such as sensor drift and miscalibration over time tend to be addressed by additional proprietary processing that differs between manufacturers and technologies.

The present examples address these issues in the art to provide a solution that has been shown by tests to be workable in the challenging environment of a construction site. Rather than taking a traditional approach of refining accuracy or extending existing systems, the inventors have determined a method of mapping between the separate intrinsic coordinate systems used by different positioning systems to allow a single mapping to a BIM model from a calibrated sensor frame of reference.

Certain Term Definitions

Where applicable, terms used herein are to be defined as per the art. To ease interpretation of the following examples, explanations and definitions of certain specific terms are provided below.

The term "positioning system" is used to refer to a system of components for determining one or more of a location and orientation of an object within an environment. The terms "positional tracking system" and "tracking system" may be considered alternative terms to refer to a "positioning system", where the term "tracking" refers to the repeated or iterative determining of one or more of location and orientation over time. A positioning system may comprise a distributed system wherein a first subset of electronic components is positioned upon an object to be tracked and a second subset of electronic components is positioned externally to the object. A positioning system may also be implemented using a single set of electronic components that is positioned upon an object to be tracked and/or a single set of electronic components that is positioned externally to the object. A positioning system may also comprise processing resources that may be implemented using one or more of an embedded processing device (e.g., upon or within the object) and an external processing device (e.g., a server computing device). Reference to data being received, processed and/or output by the positioning system may comprise a reference to data being received, processed and/or output by one or more components of the positioning system, which may not comprise all the components of the positioning system. A plurality of positioning systems as described herein may differ by one or more of: sensor devices used to track the headset (e.g., sensor devices on the headset and/or external sensor devices); method of positioning (e.g., technology or algorithm that is used); and location of use (e.g., different sensor systems may be installed in different locations and/or certain sensor systems may be unavailable in particular locations). In certain examples described herein, positioning systems track the location and orientation of an augmented reality headset over time.

The term "pose" is used herein to refer to a location and orientation of an object. For example, a pose may comprise a coordinate specifying a location with reference to a coordinate system and a set of angles representing orientation of a plane associated with the object within the coordinate system. The plane may, for example, be aligned with a defined face of the object or a particular location on the object. In other cases, a pose may be defined by a plurality of coordinates specifying a respective plurality of locations with reference to the coordinate system, thus allowing an orientation of a rigid body encompassing the points to be determined. For a rigid object, the location may be defined with respect to a particular point on the object. A pose may specify the location and orientation of an object with regard to one or more degrees of freedom within the coordinate system. For example, an object may comprise a rigid body with three or six degrees of freedom. Three degrees of freedom may be defined in relation to translation with respect to each axis in 3D space, whereas six degrees of freedom may add a rotational component with respect to each axis. In examples herein relating to a headset, the pose may comprise the location and orientation of a defined point on the headset, or on an article of headwear that forms part of the headset.

Certain example positioning systems described herein track an object within a "tracked volume". In these examples, the tracked volume represents an extent in 3D space wherein an object may be successfully tracked by the positioning system. Not all positioning systems utilise a tracked volume. In certain examples, a tracked volume may be defined using a set of one or more external tracking devices, such as beacons or camera, that are positioned at or near edge points of the volume and track an object within the volume.

The term "coordinate system" is used herein to refer to a frame of reference used by a positioning system. For example, a positioning system may define a pose of an object within three-dimensional geometric space, where the three dimensions have corresponding orthogonal axes (typically x, y, z) within the geometric space. An origin may be defined for the coordinate system where lines defining the axes meet (typically, set as a zero point—(0, 0, 0)). Locations for a coordinate system may be defined as points within the geometric space that are referenced to unit measurements along each axis, e.g. values for x, y, and z representing a distance along each axis.

The terms "intrinsic" and "extrinsic" are used in certain examples to refer respectively to coordinate systems within a positioning system and coordinate systems outside of any one positioning system. For example, an extrinsic coordinate system may be a 3D coordinate system for the definition of an information model, such as a BIM, that is not associated directly with any one positioning system, whereas an intrinsic coordinate system may be a separate system for defining points and geometric structures relative to sensor devices for a particular positioning system.

Certain examples described herein use one or more transformations to convert between coordinate systems. The term "transformation" is used to refer to a mathematical operation that may be performed on one or points (or other geometric structures) within a first coordinate system to map those points to corresponding locations within a second coordinate system. For example, a transformation may map an origin defined in the first coordinate system to a point that is not the origin in the second coordinate system. A transformation may be performed using a matrix multiplication. In certain examples, a transformation may be defined as a multi-dimensional array (e.g., matrix) having rotation and translation terms. For example, a transformation may be defined as a 4 by 4 (element) matrix that represents the relative rotation and translation between the origins of two coordinate systems. The term "calibrated transformation" is used to refer to a transformation that is determined based on measured sensor data, i.e. a transformation that is calibrated or configured (such as by determining the values of the terms in a 4 by 4 matrix) based on sensor data recorded at one or more specified locations (referred to as "control points" herein). The terms "map", "convert" and "transform" are used interchangeably to refer to the use of a transformation to determine, with respect to a second coordinate system, the location and orientation of objects originally defined in a first coordinate system. Methods of mapping between co-ordinate systems as described herein may comprise conversion of points and/or objects in one co-ordinate system to equivalents in another co-ordinate system. It will be understood that mapping may be one-way or two-way, and that a forward mapping between a first co-ordinate system and a second co-ordinate system may use a transformation and a backward mapping between the second co-ordinate system and the first co-ordinate system may use a corresponding inverse of the transformation. The choice of co-ordinate system for display and/or computation may depend on the requirements of individual implementations.

Certain examples described herein refer to a "spatial relationship". This is a relationship between objects in space. It may comprise a fixed or rigid geometric relationship between one or more points on a first object and one or more points on a second object, or between a plurality of points on a common object. In certain examples, these objects comprise different sensors for different positioning systems. The spatial relationship may be determined via direct measurement, via defined relative positioning of objects as set by a fixed and specified mounting (e.g., a rigid mount may fix two objects such as sensor devices at a specific distance with specific rotations), and/or via optimisation approaches that seek to minimise a difference between positions as derived from multiple coordinate systems.

Certain examples described herein are directed towards a "headset". The term "headset" is used to refer to a device suitable for use with a human head, e.g. mounted upon or in relation to the head. The term has a similar definition to its use in relation to so-called virtual or augmented reality headsets. In certain examples, a headset may also comprise an article of headwear, such as a hard hat, although the headset may be supplied as a kit of separable components. These separable components may be removable and may be selectively fitted together for use, yet removed for repair, replacement and/or non-use.

Certain positioning systems described herein use one or more sensor devices to track an object. Sensor devices may include, amongst others, monocular cameras, stereo cameras, colour cameras, greyscale cameras, depth cameras, active markers, passive markers, photodiodes for detection of electromagnetic radiation, radio frequency identifiers, radio receivers, radio transmitters, and light transmitters including laser transmitters. A positioning system may comprise one or more sensor devices upon an object. Certain, but not all, positioning systems may comprise external sensor devices such as tracking devices. For example, an optical positioning system to track an object with active or passive markers within a tracked volume may comprise externally mounted greyscale camera plus one or more active or passive markers on the object.

Certain examples provide a headset for use on a construction site. The term "construction site" is to be interpreted broadly and is intended to refer to any geographic location where objects are built or constructed. A "construction site" is a specific form of an "environment", a real-world location where objects reside. Environments (including construction sites) may be both external (outside) and internal (inside). Environments (including construction sites) need not be continuous but may also comprise a plurality of discrete sites, where an object may move between sites. Environments include terrestrial and non-terrestrial environments (e.g., on sea, in the air or in space).

The term "render" has a conventional meaning in the image processing and augmented reality arts and is used herein to refer to the preparation of image data to allow for display to a user. In the present examples, image data may be rendered on a head-mounted display for viewing. The term "virtual image" is used in an augmented reality context to refer to an image that may be overlaid over a view of the real-world, e.g. may be displayed on a transparent or semi-transparent display when viewing a real-world object. In certain examples, a virtual image may comprise an image relating to an "information model". The term "information model" is used to refer to data that is defined with respect to an extrinsic coordinate system, such as information regarding the relative positioning and orientation of points and other geometric structures on one or more objects. In examples described herein the data from the information model is mapped to known points within the real-world as tracked using one or more positioning systems, such that the data from the information model may be appropriate prepared for display with reference to the tracked real-world. For example, general information relating to the configuration of an object, and/or the relative positioning of one object with relation to other objects, that is defined in a generic 3D coordinate system may be mapped to a view of the real-world and one or more points in that view.

The term "object" is used broadly to refer to any entity that may be tracked. In a preferred embodiment, the object comprises a hard hat for use on a construction site. In other embodiments, the object may comprise a person, an animal, a body part, an item of equipment, furniture, buildings or building portions etc.

The term "engine" is used herein to refer to either hardware structure that has a specific function (e.g., in the form of mapping input data to output data) or a combination of general hardware and specific software (e.g., specific computer program code that is executed on one or more general purpose processors). An "engine" as described herein may be implemented as a specific packaged chipset, for example, an Application Specific Integrated Circuit (ASIC) or a programmed Field Programmable Gate Array (FPGA), and/or as a software object, class, class instance, script, code portion or the like, as executed in use by a processor. The term "coordinate alignment engine" is used to refer to an engine that has a function of aligning multiple coordinate systems for multiple positioning systems, as set out in the examples below. The term "model engine" is used to refer to an engine configured to retrieve and process an information model, such as a BIM. The model engine may perform processing to allow the BIM to be aligned with one or more positioning systems. In the present examples, a coordinate alignment engine and a model engine operating in combination replace the model positioning engine described in WO2019/048866 A1.

The term "camera" is used broadly to cover any camera device with one or more channels that is configured to capture one or more images. In this context, a video camera may comprise a camera that outputs a series of images as image data over time, such as a series of frames that constitute a "video" signal. It should be noted that any still camera may also be used to implement a video camera function if it is capable of outputting successive images over time.

Tracking on a Construction Site

A first embodiment of the present invention will now be described. The first embodiment relates to a headset for use in displaying an augmented reality BIM on a construction site. The first embodiment may be seen as an improvement to the headset described in WO2019/048866 A1. A detailed description of an example headset for the first embodiment, and its use in displaying an augmented reality BIM on a construction site, is provided herein; however, the person skilled in the art may also refer to WO2019/048866 A1 for further details on any aspects that are conserved from the examples described therein.

FIG. 1A shows a first location 1 in a construction site. In the present examples, and as described later with respect to FIG. 5, a construction site may have multiple locations configured in a similar manner to the first location 1. For example, a building site where multiple buildings are being constructed may have a plurality of locations corresponding to a respective plurality of buildings or a building with multiple floors may have a plurality of locations corresponding to a respective plurality of floors. The locations may be next to each other or may be spaced apart.

FIG. 1A shows a first positioning system 100 that is set up at the first location 1. In the present example, the first positioning system 100 comprises a laser-based inside-out positional tracking system as described in WO2019/048866 A1; however, this positioning system is used for ease of explanation and the present embodiment is not limited to this type of positioning system. In other implementations different positioning systems may be used, including optical marker-based high-accuracy positioning systems such as those provided by NaturalPoint, Inc of Corvallis, Oregon, USA (e.g., their supplied OptiTrack systems).

In FIG. 1A, the first positioning system 100 comprises a plurality of spaced apart base stations 102. In one particular implementation example, a base station 102 comprises a tracking device that is selectively operable to emit an omnidirectional synchronisation pulse 103 of infrared light and comprises two rotors that are arranged to sweep two linear non-visible optical fan-shaped beams 104, 105 across the first location 1 on mutually orthogonal axes. In the present embodiment, the base stations 102 are separated from each other by a distance of up to about 5-10 m. This then provides a tracked volume of approximately 50-300 $m^3$ (e.g., for vertical ranges of 2-3 m). In the example of FIG. 1A, four base stations 102 are employed, but in other embodiments fewer than four base stations 102 may be used, e.g. one, two or three base stations 102, or more than four base stations. Although more base stations 102 may be added to cover a greater area, the adding of base stations greatly increases cost, computation and complexities. For example, the inventors of the present invention are not aware of any installations where the number of base stations 102 is greater than 16, and the implementations with up to 16 base stations are rare and difficult to configure. It may be that manufacturers of tracked-volume systems implement hard-configured upper limits to the number of base stations as it is just not possible or practical to implement workable systems with a large number of base stations. As described in WO2019/048866 A1, by sweeping the laser beams 104, 105 across the construction site 1 at an accurate constant angular speed and synchronising the laser beams 104, 105 to an accurately timed synchronisation pulse 103, each base station 102 in a laser inside-out positioning system generates two mutually orthogonal spatially-modulated optical beams 104, 105 in a time-varying manner that can be detected by opto-electronic sensors within the tracked volume for locating the position and/or orientation of one or more tracked objects within the tracked volume. Other positioning systems may use other technologies to track an object using different technologies, including the detection of one or more active or passive markers located on the object as observed by tracking devices in the form of one or more cameras mounted at the base stations 102 and observing the tracked volume.

In preferred implementations the first positioning system 100 is a high-accuracy system with millimetre accuracy, such as sub-5 mm accuracy depending on the positioning system being used. The high accuracy systems referenced herein and in WO2019/048866 A1 generally allow for 1-3 mm accuracy and thus allow a BIM to be accurately aligned with the external construction site to facilitate construction. Other alternative optical tracking methods also provide sub-millimetre accuracy, e.g. those that comprise a camera rig for active and/or passive marker tracking.

Figure 1B:
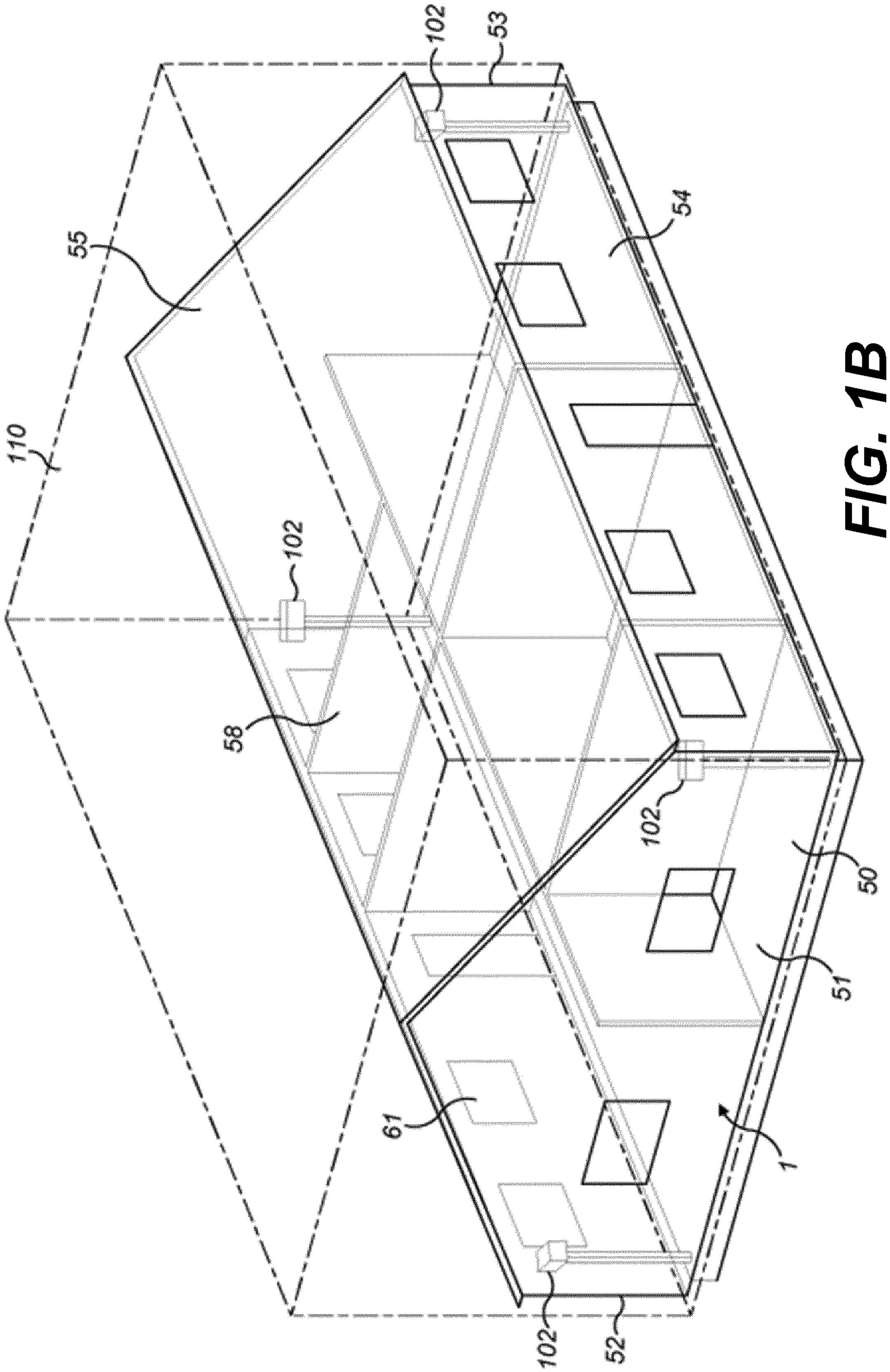
FIG. 1B is a schematic illustration showing how BIM data may be aligned with a view of the construction site.

FIG. 1A also shows a user 2*a*, 2*b* located in the tracked volume. The user 2*a*, 2*b* wears a headset shows at that shown in FIG. 2A that allows them to use the first positioning system 100 to view, via a head-mounted display (HMD) of the headset, a virtual image of one or more internal partitions 52, 58 that are defined in the BIM and that may be aligned with part-constructed portions of a building 60. FIG. 1B shows a three-dimensional BIM 110 for a building 50 to be constructed that is aligned with the tracked volume. The building 50 has exterior walls 51, 52, 53, 54, a roof 55 and interior partitions, one of which is shown at 58. One of the walls 52 is designed to include a window 61. The BIM 110 is defined with respect to an extrinsic coordinate system, which may be a geographic coordinate system (e.g., a set of terrestrial coordinates) or a specific Computer Aided Design (CAD) reference origin. By calibrating the alignment of the BIM 110 with the first location 1, a user 2*a*, 2*b* may see how a portion of the building in progress, such as window 61 matches up with the original three-dimensional specification of the building within the BIM. Adjustments may then be made to the building in progress if the building 50 is not being constructed according to the specification. This process is described in detail in WO2019/048866 A1.

In WO2019/048866 A1 it is described how control points may be defined within the tracked volume that have known real-world locations. For example, these may be fixed points with known geographic coordinates and/or moveable points that are defined with reference to tracking devices 102 that implement the tracked volume. These control points may be measured by locating sensor devices for the first positioning system 100 at the control points. A transformation may then be derived that maps an intrinsic coordinate system used by the first positioning system 100 to the extrinsic positioning system used by the BIM. This may comprise a mathematical transform that comprises rotation and translation terms. The transformation may map an origin of the intrinsic coordinate system to an origin of the extrinsic coordinate system, and so map positions and orientations determined by the first positioning system 100 to real-world positions and orientations that are represented in the BIM.

While the first positioning system 100 may be used to display the BIM as a virtual image within the tracked volume there are several challenges still to be addressed. A first is that the tracked volumes may be relatively small compared to a large extent of a construction site. To cover all of the construction site applying the approaches of WO2019/048866 A1 would require many tracked volumes and/or many more tracking devices 102. Typically, tracking systems similar to the positioning systems described in WO2019/048866 A1 are mainly designed for predefined small discrete volumes. To cover a wider area, the typical solution is to just tessellate the configuration of FIG. 1A.

This then results in multiple tracked volumes where the user 2*a*, 2*b* enters a tracked volume, switches on a headset, and operates within the tracked volume based on a calibrated transformation for the tracked volume. However, when moving to work in another tracked volume, such as a further building or building floor, the user 2*a*, 2*b* shuts down the headset, travels to the other tracked volume, re-activates the headset, and operates within the other tracked volume based on a further calibrated transformation for the other tracked volume. This is inconvenient and may introduce operational errors. Indeed, it may take around 15 minutes to activate and boot a headset within a tracked volume, and with comparative systems this needs to be performed for each tracked volume. Effectively, a wider area is covered by duplicating the functionality described in WO2019/048866 A1 for a plurality of independent tracked volumes. This may be the case even if a common technology for the positioning system is used. Although some positioning systems allow the addition of further beacons or tracking devices to cover wider areas, there is an inherent limit to how far an object may be tracked, as cost and complexity may increase exponentially with every additional tracking device. Known issues such as drift and degradations in accuracy also occur as the size of the tracked volume increases, which is why many positioning system manufacturers recommend the simple independent duplication of known smaller tracked volume configurations.

Another challenge faced when implementing the approach described in WO2019/048866 A1 is that positioning systems are not perfect. Accuracy and quality of tracking is generally proportional to the cost of tracking devices, with higher specification devices providing better accuracy but often being of considerable cost. Also, construction sites tend to differ from controlled studios where tracking systems are often used, for example for film or computer game motion capture. Indeed, construction sites are a particularly challenging environment for positioning systems, with dust, heavy equipment, and constant change. This means that even ruggedized devices for positioning systems struggle to operate successfully 100% of the time. Moreover, beacons or tracking devices are subject to knocks or mispositioning during construction that can lead to errors in the positioning data.

Solutions to Tracking Challenges

Certain examples described herein address the challenges described above. These examples use a plurality of positioning systems to track an object with an environment and use configured transformations to map between different coordinate systems. This then allows pose-sensitive information to be displayed, e.g. as part of an augmented reality display, despite issues with any one individual positioning system, such as lack of coverage and/or erroneous positioning due to environmental conditions. In particular, in a first embodiment described herein, a headset is adapted to use a plurality of positioning systems so as to display an augmented reality BIM within a head-mounted display within a construction site.

Figure 2A:
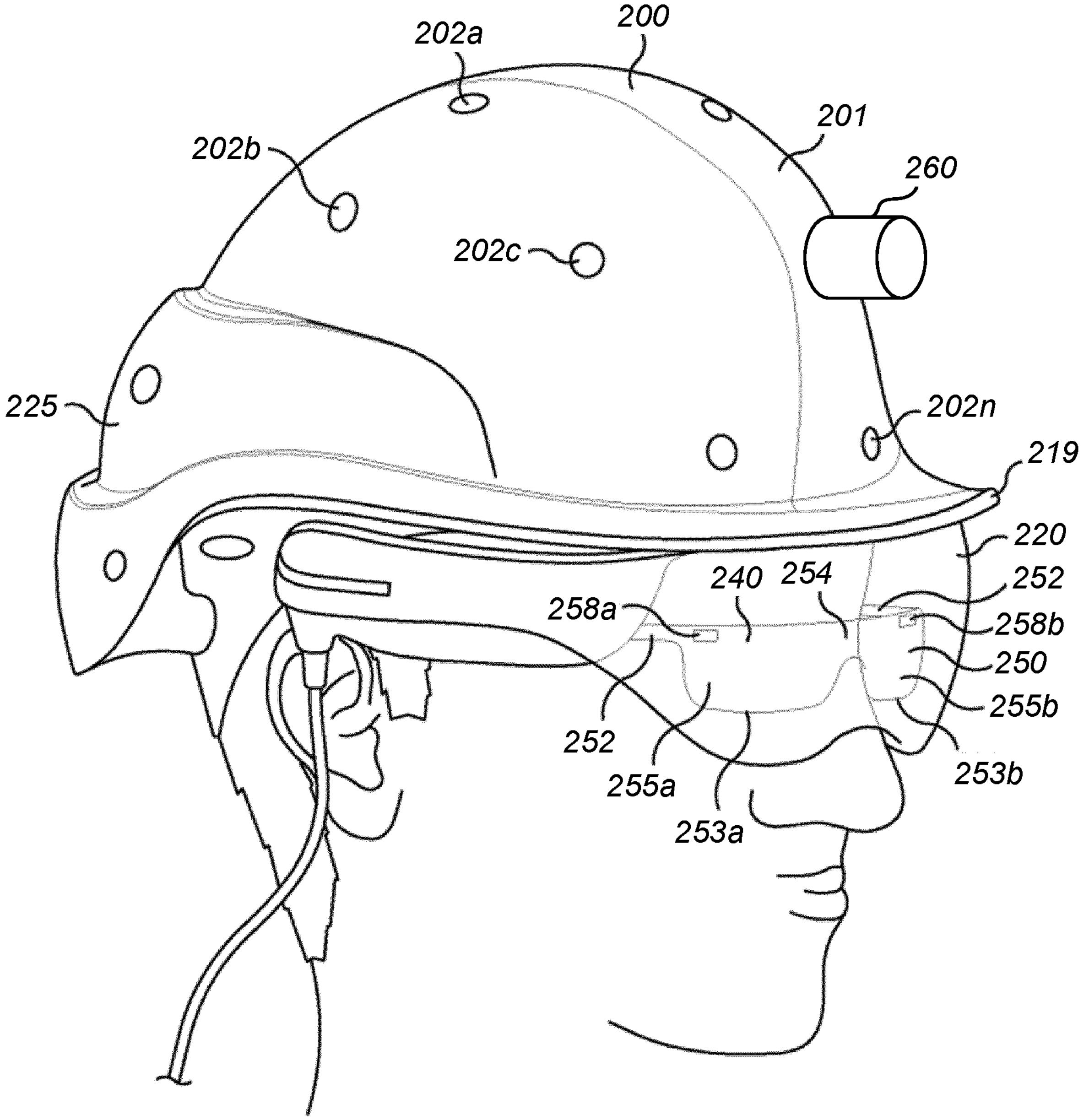
FIG. 2A is schematic illustration showing, in perspective and from one side, a hard hat incorporating an augmented reality display in accordance with a first embodiment of the present invention.

FIG. 2A shows a hard hat 200 and a set of augmented reality glasses 250. These collectively form a headset for displaying an augmented reality BIM within a construction site. The first embodiment of the present invention is described herein with respect to a headset that is similar to that described in WO2019/048866 A1, with certain important differences for improved BIM display and tracking in demanding and large-scale environments. The hard hat 200 comprises an article of headwear in the form of a construction helmet 201 of essentially conventional construction, which is fitted with a plurality of sensor devices 202*a*, 202*b*, 202C, . . . , 202*n* and associated electronic circuitry, as described in more detail below, for tracking the position of the hard hat 200 within a tracked volume defined by an inside-out positional tracking system that is set up at a construction site, such as the first positioning system 100 at the first location 1 as described above in relation to FIG. 1A. The helmet 601 comprises a protruding brim 219 and may be configured with the conventional extras and equipment of a normal helmet. It should be noted that although the example of FIGS. 2A and 2B comprise particular sensor devices for particular positioning systems, these are provided for ease of explanation only; implementations may use any type or technology for the positioning systems, including known or future "off-the-shelf" positioning systems.

Figure 2B:
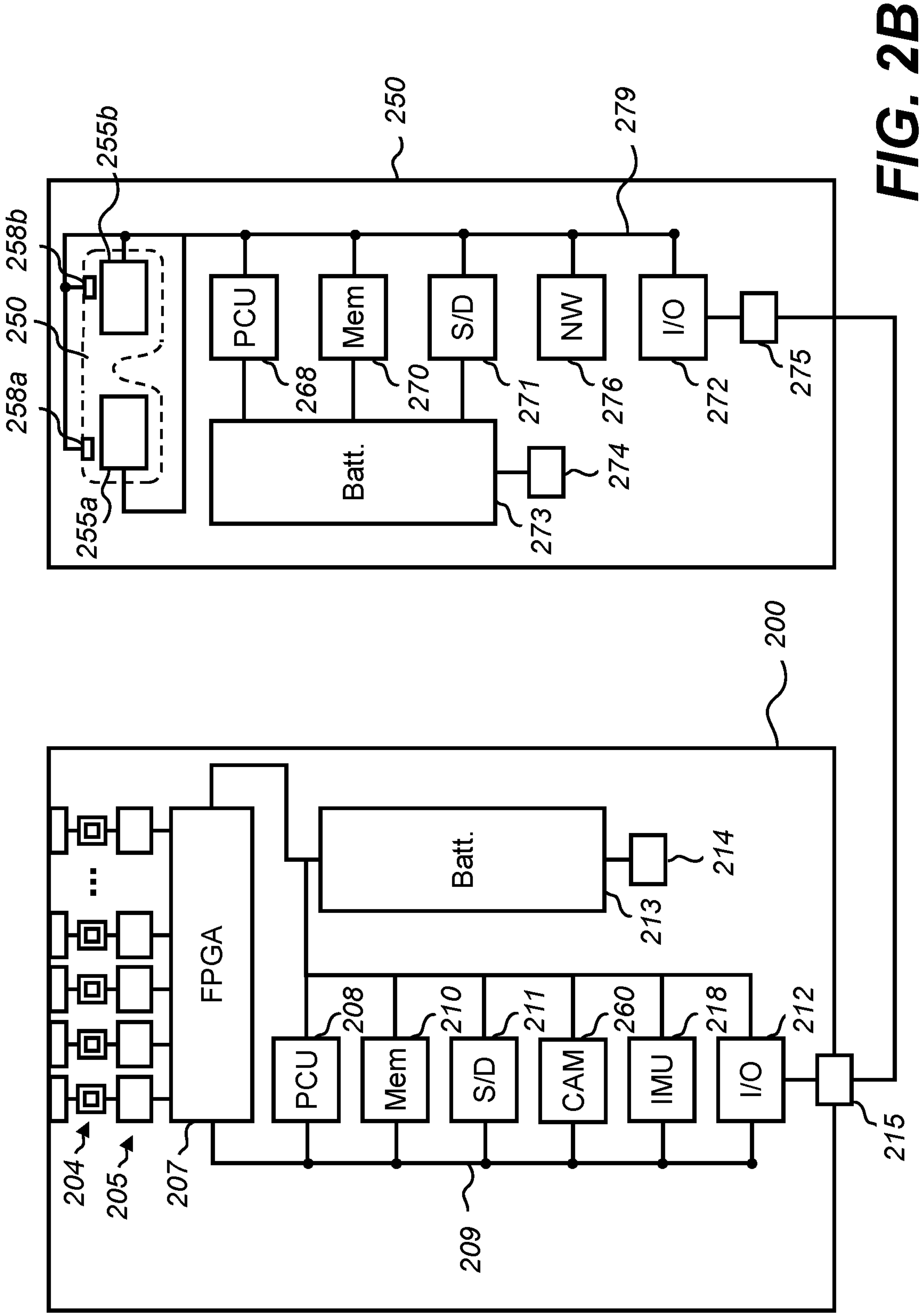
FIG. 2B is schematic illustration showing electronic components implementing a tracking module and an augmented reality display module for the hard hat of FIG. 2A.

FIG. 2B shows the electronic circuitry that may form part of the headset of FIG. 2A. The electronic circuitry may be mounted within, upon, or in association with one or more of the hard hat 200 and the augmented reality glasses 250. For example, the left-hand side of FIG. 2B shows electronic circuitry that may be incorporated within or mounted upon the hard hat 200 and the right-hand side of FIG. 2B shows electronic circuitry that may be incorporated within or mounted upon the augmented reality glasses 250. The configurations shown in FIGS. 2A and 2B is provided for example only, and actual implementations may differ while retaining the functionality discussed later below. The electronic components of the hard hat 200 may be accommodated within a protected cavity 225 formed in the helmet 201 as shown in FIG. 2A. The hard hat 200 may have suspension bands inside the helmet 201 to spread the weight of the hard hat 200 as well as the force of any impact over the top of the head.

The example helmet 201 in FIG. 2A shows a set of n sensor devices 202*i* that are mounted with respect to the helmet 201. The number of sensor devices may vary with the chosen first positioning system 100, but in the example shown in FIG. 1A, n may equal 32. In these examples, the sensor devices 202*i* are distributed over the outer surface of the helmet 201, and in certain examples at least five sensors may be required to track the position and orientation of the hard hat 200 with high accuracy. As shown in FIG. 2B, in the present example, each sensor device 202*i* comprises a corresponding photodiode 204 that is sensitive to infrared light and an associated analogue-to-digital converter 205*a*. The photodiodes 204 may be positioned within recesses formed in the outer surface of the helmet 201. In the present example, digital pulses received from the analogue-to-digital converters 205 are time-stamped and aggregated by a Field Programmable Gate Array (FPGA) 207, which is connected to a processor 208 by a local data bus 209. The local data bus 209 also connects to a memory device 210, a storage device 211, and an input/output (I/O) device 212. The electronic components of the hard hat 200 are powered by a rechargeable battery unit 213. A power connector socket 214 is provided for connecting the battery unit 213 to a power supply for recharging. The I/O device 212 may comprise a dock connector 215 such, for example, a USB port, for communicatively coupling the electronic circuitry of the hard hat 200 to other devices and components. The local data bus 209 also connects to an (optional) inertial measurement unit (IMU) 218 of the kind found in virtual reality and augmented reality headsets, which comprises a combination of one or more accelerometers and one or more gyroscopes. The IMU may comprise one accelerometer and one gyroscope for each of pitch, roll and yaw modes.

Returning to FIG. 2A, in the present example, the headset comprises safety goggles 220, which serve not only to protect the user's eyes while on location in the building site, but also serve to protect the augmented reality glasses 250, which are mounted inside the goggles 220. In the present example, the goggles 220 are mounted to the helmet 201 such that they are recessed slightly behind the brim 219 to afford a degree of protection for the goggles 220. It will be understood that in embodiments where the augmented reality glasses 200 themselves are ruggedised and ready for construction, the safety goggles 220 may be omitted. In other embodiments, the helmet 201 may comprise a safety visor.

The augmented reality glasses 250 comprise a shaped transparent (i.e., optically clear) plate 240 that is mounted between two temple arms 252. In the present example, the augmented reality glasses 250 are attached to the hard hat 200 such that they are fixedly secured in an "in-use" position relative to the sensors 202*i* and are positioned behind the safety goggles 220. The augmented reality glasses 250 may, in some embodiments, be detachable from the hard hat 200, or they may be selectively movable, for example by means of a hinge between the hard hat 200 and the temple arms 252, from the in-use position to a "not-in-use" position (not shown) in which they are removed from in front of the user's eyes.

In the example of FIG. 2A, the transparent plate 240 is arranged to be positioned in front of the user's eyes and comprises two eye regions 253*a*, 253*b*, which are arranged to be disposed in front of the user's right and left eyes respectively, and an interconnecting bridge region 254. Attached to, or incorporated in, each of the eye regions 253*a*, 253*b* is a respective transparent or semi-transparent display device 255*a*, 255*b* for displaying augmented reality media content to a user as described below, whilst allowing the user to view his or her real-world surroundings through the glasses 250. The augmented reality glasses 250 also comprise lenses (not shown) positioned behind each display device 255*a*, 255*b* for viewing an image displayed by each display device. In some examples, the lenses may be collimating lenses such that an image displayed by each display device 255*a*, 255*b* appears to the user to be located at infinity. In some examples, the lenses may be configured to cause rays of light emitted by the display devices 255*a*, 255*b* to diverge, such that an image displayed by each display device 255*a*, 255*b* appears at a focal distance in front of the augmented reality glasses 250 that is closer than infinity. In the present example, the lenses are configured and arranged with the display devices 255*a*, 255*b* such that images displayed by the display devices 255*a*, 255*b* appear to be located at a focal distance of 8 m in front of the user.

In certain variations of the present embodiment, eye-tracking devices may also be used. The example of FIG. 2A shows one of these variations. Within each eye region 253*a*, 253*b*, the transparent plate 240 carries a respective eye-tracking device 258*a*, 258*b* for tracking the position of the user's eyes when the hard hat 200 is worn. In particular, each of the eye-tracking devices 258*a*, 258*b* is configured to detect the position of the centre of the pupil of a respective one of the user's eyes for the purpose of detecting movement of the augmented reality glasses 250 relative to the user's eyes in use and to generate and output display position data relating the position of the augmented reality glasses 250 relative to the user's head. Those skilled in the art will be aware of numerous other solutions for tracking the position of the augmented reality glasses 250 relative to the user's head in use, including optical sensors of the kind disclosed by U.S. Pat. No. 9,754,415 B2 and a position obtaining unit of the kind disclosed by US 2013/0235169 A1, both of which are incorporated by reference herein. Monitoring movement of the augmented reality glasses 250 relative to the user's head may be useful in cases where the hard hat 200 is liable to move relative to the user's head but may not be required in all cases, e.g. may not be required where the hard hat 200 is relatively secured to the user's head. In the present described variation, two eye-tracking devices 258*a*, 258*b* are provided, one associated with each of the user's eyes, but in other implementations, a single eye-tracking device may be employed associated with one of the eyes.

In terms of the electronic circuitry as shown in FIG. 2B, the transparent display devices 255*a*, 255*b* and eye-tracking devices 258*a*, 258*b* are connected to a local data bus 279 for interconnection with a processor 268, a memory unit 270, a storage device 271, and an input/output (110) device 272. Power for the electronic components is provided by a rechargeable battery unit 273, which is connected to a power connector socket 274 for connecting the battery unit 273 to a power supply for recharging. The local data bus 279 is also connected to a dock connector 275 and a network interface 276. The network interface 276 may comprise a wireless (WiFi) microcontroller. Although the example of FIG. 2B shows separate battery supplies, in other examples, a single power connector socket may be provided for both the hard hat 200 and the glasses 250, and in some examples, a single rechargeable battery unit may be provided for powering both sets of electronic circuitry.

The present example of FIGS. 2A and 2B differs from the corresponding examples of WO2019/048866 A1 in that the headset is implemented in association with a plurality of positioning systems. In preferred examples, the positioning systems are different. In the present example, the sensor devices 202*i* (and the associated circuitry in the form of the photodiodes 204, the analogue-to-digital converters 205 and the FPGA 207) form part of the first positioning system 100 shown in FIG. 1A. The first positioning system 100 may comprise a distributed positioning system with components present on the headset and external components such as tracking devices 102. The plurality of positioning systems may comprise a heterogeneous mix of different types of positioning system including those with external devices and those that only utilise local sensor devices. In FIGS. 2A and 2B, a second positioning system comprises a sensor device in the form of a camera 260 that is mounted on the helmet 201 and, in this example, faces forward in line with the gaze of the user. The camera 260 may comprise a video camera. Those skilled in the art will understand that a camera for a positioning system may be mounted in any number of different positions and then configured accordingly. For example, there may be one or more (or additional) camera devices that capture image data from one or more of the sides and the back of the helmet 201. The mounting shown in FIG. 2A is simply illustrative. The camera 260 may comprise a greyscale video camera, a Red-Green-Blue (RGB) video camera or an RGB and Depth (RGB-D) video camera. The camera 260 may comprise a single monocular video camera or a plurality of stereo cameras. In certain cases, the camera 260 may comprise one or more event cameras and/or one or more lidar sensors (i.e. laser-based distance sensors). An event camera is known in the art as an imaging sensor that responds to local changes in brightness, wherein pixels may asynchronously report changes in brightness as they occur, mimicking more human-like vision properties. The choice of camera 260 may vary between implementations and positioning systems. Resolutions and frame rates may be selected so as to achieve a desired positioning capability. In FIG. 2B, the camera 260 is communicatively coupled to the local data bus 209 and is powered by the battery 213. Although in the example of FIG. 2B, the camera 260 forms part of the hard hat 200, in other examples it may form part of a separate second positioning system module that is communicatively coupled to one or more of the hard hat 200 and the augmented reality glasses 250.

The processor 208 is configured to load instructions stored within storage device 211 (and/or other networked storage devices) into memory 210 for execution. A similar process may be performed for processor 268. In use, the execution of instructions, such as machine code and/or compiled computer program code, by one or more of processors 208 and 268 implement positioning functions for the plurality of positioning systems. Although the present examples are presented based on certain local processing, it will be understood that functionality may be distributed over a set of local and remote devices in other implementations, for example, by way of network interface 276. The computer program code may be prepared in one or more known languages including bespoke machine or microprocessor code, C, C++ and Python. In use, information may be exchanged between the local data buses 209 and 279 by way of the communication coupling between the dock connectors 215 and 275. It should further be noted that any of the processing described herein may also be distributed across multiple computing devices, e.g. by way of transmissions to and from the network interface 276.

Aligning Coordinate Systems for BIM Display

As described with respect to FIGS. 2A and 2B, in a first embodiment of the present invention, a headset for use in construction at a construction site is provided. The headset comprises an article of headwear (in the present example, hard hat 200) and a head-mounted display for displaying a virtual image of a building information model (in the present example, augmented reality glasses 250). The headset further comprises sensor devices for a plurality of positioning systems. In the present example, the sensor devices comprise sensor devices 202*i*, which are associated with a first positioning system 100 as shown in FIG. 1A and camera 260, which is associated with a second positioning system. The headset also comprises electronic circuitry as shown in FIG. 2B that implements an electronic control system by way of at least one of processors 208 and 268. For ease of initial explanation, two positioning systems of different types will be described, however the first embodiment may be implemented using any two or more positioning systems of various types. The second positioning system that receives sensor data from the camera 260 may comprise any known monocular simultaneous location and mapping (SLAM) system that receives image data (e.g., based on RGB or greyscale cameras). Other positioning systems may also be used that use multiple cameras, event cameras and/or additional depth channel data.

In the first embodiment, a set of transformations are defined that map between the coordinate systems of the plurality of positioning systems. Each transformation may map an origin in one coordinate system to an origin in another coordinate system, e.g. by way of a six-degrees of freedom transformation. In one case, the first positioning system described above that comprises sensor devices 202*i* may have an origin at a point somewhere on or within the hard hat, such as at an origin of a curve of the hard hat. The second positioning system described above that comprises the camera 260 may have as an origin a principal point of the camera (e.g., a centre of an image plane for the camera). The origins may not have a stable position over time and may vary based on an accuracy of the positioning system (e.g., the origin of the first positioning system may vary by ~1 mm or less and the origin of the second positioning system may vary by ~12 mm). The BIM (or part of the BIM) may also be defined in relation to an origin of an extrinsic coordinate system. When positions are indicated in a common or shared coordinate system, e.g. wherein one or more coordinate systems are mapped to this common (i.e. single) coordinate system including positions within the BIM, projections from the BIM model may be made onto the construction site as viewed by the headset to display the BIM as an augmented reality image. The common coordinate system may be selected as a coordinate system of a higher or highest accuracy positioning system. In one case, a common coordinate system may be configured to have an origin that is located between a user's eyes.

The set of transformations may be determined in a number of different ways depending on the implementation and requirements. In one case, the set of transformations may be determined based on one or more spatial relationships between the sensor devices of the plurality of positioning systems with respect to the headset. In another case, the set of transformations may be determined based on measurement of a defined set of control points that are measured by a plurality of the positioning systems (e.g., control points that are defined at known real world positions based on markers or checkerboards or the like). In yet another case, the set of transformations may be determined using computer vision tools. Multiple approaches may also be combined, e.g. initial values of the set of transformations may be set based on known spatial relationships (e.g., from CAD models of the headset or helmet), and then these initial values may be optimised based on measurement of a defined set of control points and/or computer vision tools. In certain cases, the transformations may be determined by minimising a photometric error between images generated using points from each of two or more positioning systems within a common coordinate system.

In one example, the set of transformations may be determined by optimising a difference between points from different positioning systems that are represented in the common coordinate system. In a preferred case, one or more transformations may be initialised based on a priori knowledge, such as one or more spatial relationships between the sensor devices of the plurality of positioning systems with respect to the headset. For example, as shown in FIG. 2A, there is a fixed spatial relationship between a front or image plane of the camera 260 and the sensor devices 202*i* due to the rigid polymer casing of the hard hat 200. The fixed spatial relationship may be defined as part of the manufacturing specification of the hard hat 200 and the hard hat 200 may be manufactured to suitable tolerances. In certain other examples, one or more of the camera 260 and the sensor devices 202*i* may be removably mounted to the hard hat 200, e.g. by way of a mounting rigidly attached to the hard hat 200. In this case, the position and orientation of the sensor devices 260, 202*i* with respect to one another (i.e., the relative pose of each) may be measured and/or manually entered during a calibration phase after the sensor devices have been fixably mounted to the hard hat 200. In yet another case, one or more of the sensor devices 260, 202*i* may be moveably mounted, e.g. camera 260 may move or pan via one or more actuator sets or a moveable arm. In this case, position sensors associated with a moveable mount (e.g., internal angle sensors and/or external image-based sensors) may be used, together with known properties of the moveable mount (such as the fixed length of mounting arms etc.) to determine a current position of the sensor devices 260, 202*i* with respect to each other. As such, in certain implementations, the set of transformations need not be static, but may be dynamically updated based on a state of the headset.

In the case that the set of transformations are based on an optimisation, this may comprise a non-linear optimisation. For example, a non-linear function may be defined representing a difference between positions of the one or more defined points derived from two or more coordinate systems of two or more different positioning systems. Optimisation may be performed over one or more of points in space and points in time. Optimisation may be based on differences between images generated based on data from different positioning systems. For example, an image may be generated by projecting points from one or more coordinate systems and comparing these with camera images. In one case, one or more of points and images may be generated with respect to the world or reference coordinate system of the BIM, e.g. using a calibrated transformation to map from a first coordinate system of the first positioning system to the world or reference coordinate system and using an initial transformation between first and second coordinate systems to map from the second coordinate system to the first coordinate system, and then using the calibrated transformation to map from a first coordinate system of the first positioning system to the world or reference coordinate system. This may represent a non-linear operation. In this case, the calibrated transformation may be accurate but the transformation between first and second coordinate systems may be refined based on measurements. The optimisation may be performed with respect to the terms of the initial transformation, e.g. by determining updated values of a transformation matrix for this initial transformation that minimise a difference between the representations in the world or reference coordinate system. Known optimisation computing libraries (such as TensorFlow) may be used to perform the optimisation (e.g., using approaches such as stochastic gradient descent).

In preferred examples, the set of transformations are each defined as a matrix transformation having rotation and translation terms. For example, each transformation may comprise a 3×3 rotation matrix and a 3×1 translation vector, which may be provided as a 4×4 transformation matrix. This transformation matrix may thus define the relative rotation and translation between the origins of the coordinate systems for any two selected positioning systems. To transform points, a 4×1 vector may be defined with an additional unit element, e.g. [x, y, z, 1], thus allowing a transformation via matrix-vector multiplication (e.g., a dot product), where the first three elements of a resultant 4×1 vector are taken as the new position (e.g., [x', y', z',_]).

In a simple case, where there are first and second positioning systems, the set of transformations may comprise a single transformation that maps between a coordinate system for the first positioning system and a coordinate system for the second positioning system. In particular, the transformation may be a matrix transformation that maps points in the second coordinate system used by the second positioning system to points in the first coordinate system used by the first positioning system. As discussed above, in these examples, the coordinate systems represent intrinsic frames of reference for each of the positioning systems and each coordinate system is used to define positions and orientations of objects within an environment sensed by the respective positioning system. For example, the first positioning system 100 may define points within a coordinate system that is based on the tracked volume, where a particular point in the tracked volume (such as a defined corner) is taken as the origin for the coordinate system, and the second positioning system may define points within a coordinate system based on a fixed calibration point within the view of the camera device 260 and/or a starting location for the tracking. The transformation may be seen to map from one origin to another.

As well as the set of transformations discussed above, a particular calibrated transformation may be defined to map from at least one of the coordinate systems of the plurality of positioning systems to an extrinsic coordinate system in which the BIM is defined. For example, the extrinsic coordinate system may be a geographic coordinate system that defines points with respect to a local or global terrestrial frame of reference (e.g., based on a latitude and longitude defined with at least 7 decimal places and a height) and/or a reference coordinate system as defined by a CAD program or format. In a preferred example, the calibrated transformation is defined with respect to the positioning system with the highest accuracy, which may be the first positioning system 100 in the present example. The calibrated transformation may be defined in a similar form to the set of transformations, e.g. a 4×4 transformation matrix with rotation and translation terms. Methods for determining a calibrated transformation between an inside-out position tracking system similar to the first positioning system 100 shown in FIG. 1A are described in WO2019/048866 A1. In one case, determining the calibrated transformation comprises: receiving control point location data representing the positions of a plurality of control points at the construction site in the extrinsic coordinate system of the BIM; receiving control point tracking data representing the positions of the control points in the intrinsic coordinate system used by the first positioning system 100; and relating the positions of the control points in the intrinsic and extrinsic coordinate systems to derive the at least one calibrated transformation.

In use, the set of transformations and the calibrated transformation may be stored in one or more of storage devices 211 and 271, and loaded into one or more or memories 210 and 270 as a multi-dimensional array structure that is useable for linear algebra computations that are performed under the control of one or more of processors 208 and 268. In use, the set of transformations and the calibrated transformation may be retrieved and used to convert between a coordinate system of a selected positioning system and the extrinsic coordinate system used by the BIM to render a virtual image of the building information model on the head-mounted display. In certain cases, additional dedicated array processors, such as linear algebra accelerators, graphical processing units, and/or vector co-processors, may also be used to apply the transformations. Conversion between coordinate systems may comprise applying a defined transformation matrix to points defined in each (three-dimensional) coordinate system. Conversion between the coordinate systems allows the information defined with the BIM, such as locations of building portions such as window 61, to be rendered as a virtual image upon one or more of the transparent display devices 255*a*, 255*b* of the augmented reality glasses 250. For example, a pose of the headset may be determined using positioning systems, the pose as defined above representing the position and orientation of the headset within the coordinate system of the one of the plurality of positioning system. Once a pose and BIM are defined in a common or shared coordinate system, projections using the pose to different portions of the BIM may be computed and used to render the virtual image for display. The conversions between the different coordinate systems allow points in different spaces represented by different coordinate systems to be represented in a common space.

As compared to WO2019/048866 A1, the first embodiment provides an improvement whereby as well as a conversion between the intrinsic coordinate system of a single tracking system and the extrinsic coordinate system of the BIM, there is a further conversion between multiple intrinsic coordinate systems. This greatly increases the flexibility of the headset, as it may be tracked sequentially or simultaneous by multiple positioning systems while maintaining alignment of the BIM for views via the augmented reality classes. It further accommodates fluctuations and errors in any one positioning system by fusing data from other, different, positioning systems. It allows a user to quickly and easily navigate a large construction site with many different areas and heterogeneous tracking systems without a cumbersome re-calibration for each individual positioning system. It also avoids the cost of having to set up multiple sites, e.g. the calibration for one positioning system may be used to calibrate other positioning systems.

Example Coordinate Alignment Engine

Figure 3:
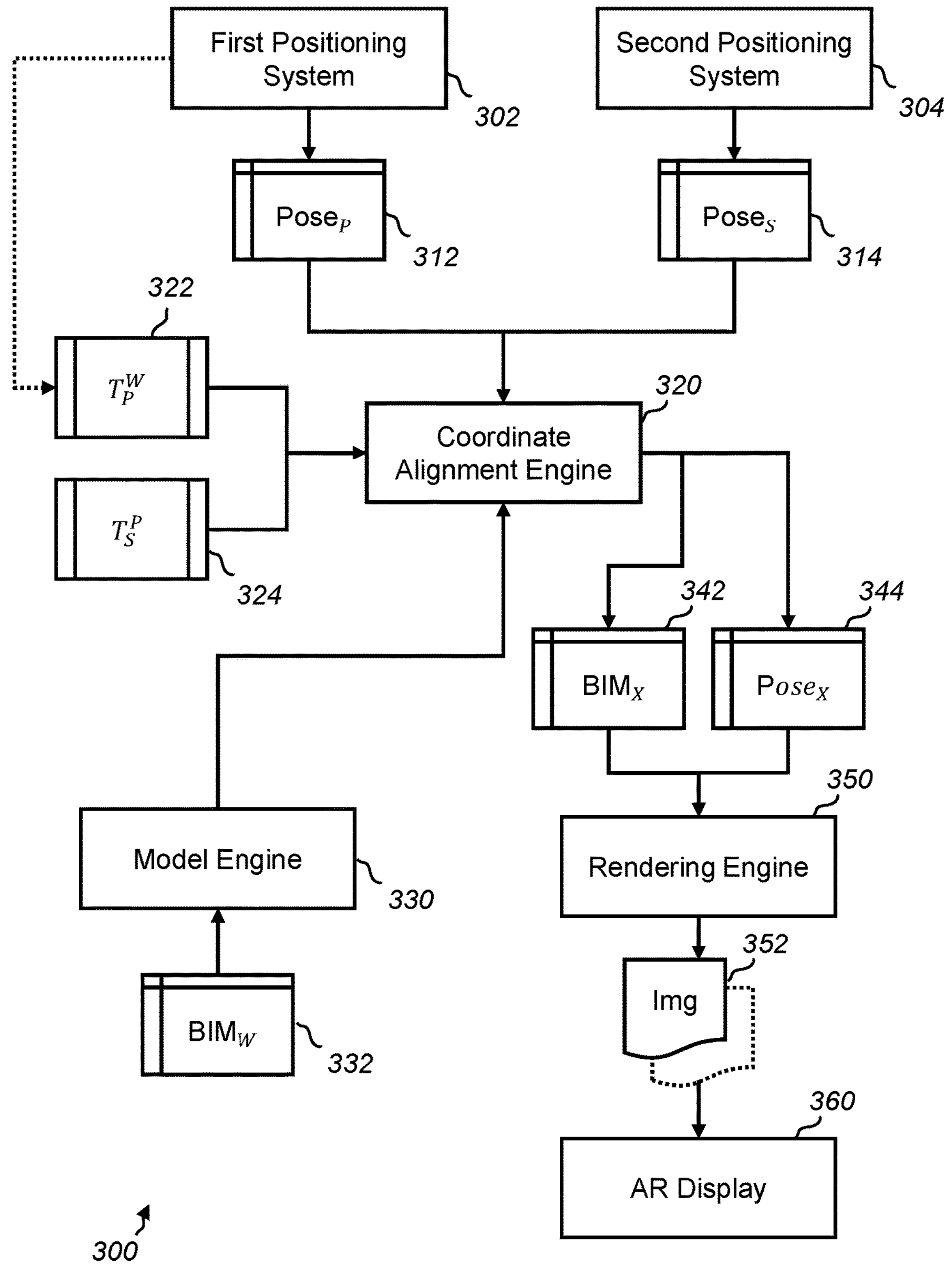
FIG. 3 is a system diagram showing use of a co-ordinate alignment engine to align multiple positioning systems as used by the hard hat of FIG. 2A in accordance with the first embodiment of the present invention.

A schematic diagram of an example system 300 for performing the process described above is shown in FIG. 3. FIG. 3 shows a first positioning system 302 and a second positioning system 304. The first and second positioning systems 302, 304 may be the first and second positioning systems described above, or any other set of positioning systems, including optical positioning systems, a global positioning system (GPS), and radio-based positioning systems. The first and second positioning systems 302, 304 may be at least in part implemented via local processing on one or more of processors 208 and 268, e.g. based on sensor data received over the local data bus 209 from the FPGA 207 and the camera 260. For example, a SLAM system may send images to a remote server with additional computing resources (e.g., graphical processing units and the like) for rapid localisation and mapping, with tracking data then being returned to the headset. In the example system 300 of FIG. 3, each positioning system is configured to output a pose representing a position and orientation of the hard hat 200 within a coordinate system defined within the positioning system. The first positioning system 302 thus determines, based on sensor data, a first pose 312 within a coordinate system for the first positioning system and second positioning system 304 determines, based on sensor data, a second pose 314 within a coordinate system for the second positioning system. For example, the first pose 312 may be determined at time t based on data from sensor devices **202*i* and the second pose 314 may be determined at the same time based on data from camera 260**. In these examples, the positioning systems are independent. This allows different positioning systems from different manufacturers and/or that use different technologies to be used without worrying about interoperability.

In FIG. 3, the first pose 312 and the second pose 314 are received by a coordinate alignment engine 320. The coordinate alignment engine 320 may be implemented using computer program code that is stored in storage device 211, loaded into memory 210 and is executed by processor 208. It may also be implemented within the corresponding components of the augmented reality glasses 250. The coordinate alignment engine 320 may be provided as a functional component of electronic circuitry of the hard hat 200 as shown in FIG. 2B. In FIG. 3, the coordinate alignment engine 320 receives a calibrated transformation $$322 - T_P^W -$$

that maps between the intrinsic coordinate system of the first positioning system (denoted here by p—primary) and the extrinsic coordinate system of the BIM (denoted here by w—world) and a system transformation $$324 - T_S^P -$$

that maps between the intrinsic coordinate system of the first positioning system 302 (denoted here by p—primary) and the intrinsic coordinate system of the second positioning system 304 (denoted here by s—secondary). These transformations may be defined as discussed above.

The coordinate alignment engine 320 is also communicatively coupled to a model engine 330. Like the coordinate alignment engine 330, the model engine 330 may be implemented using the processing components of the electronic circuitry shown in FIG. 2B. The model engine 330 is configured to receive and process model data representing BIM as defined in the extrinsic coordinate system (again denoted here by w—world). The BIM data 332 may be stored locally, such as in one or more of the storage devices 211 and 271, or may be received in portions via the network interface 276. The model engine 330 may perform any initial pre-processing of the BIM data to allow points and geometric structures defined in the extrinsic coordinate system of the BIM to be accessible by the coordinate alignment engine 320.

The coordinate alignment engine 320 is configured to receive the first pose 312, the second pose 314 and the BIM data 332 and to output BIM data 342 and pose data 344 with respect to a selected intrinsic coordinate system (denoted here by x, where x may be p, s or a third fused system j). In one case, the intrinsic coordinate system used for the output may be the primary coordinate system of the first positioning system 302. In this case, the coordinate alignment engine 320 may map the second pose 314 to the first coordinate system using the system transformation 324 and may also map the BIM data 332 to the first coordinate system using the calibrated transformation 322. Hence, as well as being able to view the BIM data 332 relative to the first pose 312, it is also possible to use the mapped second pose 314 in the first coordinate system to make corrections to the first pose 312. Also, when a user exits a tracked volume, or when there is interruption to the signals received by the first positioning system 302, the second pose 314 may be mapped to the primary coordinate system of the first positioning system 302 and used together with the mapped BIM data 342, which is also within the first coordinate system.

In one variation, the coordinate alignment engine 320 may be configured to determine an aggregate pose based on the first pose 312 and the second pose 314, such that the BIM and pose data 342, 344 represents a mapping to a third coordinate system that is used to render the BIM model. In this case, the set of transformations obtained by the coordinate alignment system 320 may comprise transformations that map from the coordinate systems from the positioning systems 302, 304 to an aggregate or fused coordinate system. In this case, the calibrated transformation 322 may map from the extrinsic coordinate system of the BIM model 332 to the aggregate or fused coordinate system.

Returning to FIG. 3, the BIM data 342 and pose 344 within the selected common coordinate system are then received by a rendering engine 350. The rendering engine 350 may be implemented within the electronic circuitry for the augmented reality glasses 250, such using computer program code that is executed by processor 268. The rendering engine 350 is configured to render one or more virtual images 352 of the BIM relative to the pose (i.e., position and orientation) of the hard hat 200 and to send the virtual images 352 to an augmented reality display 360. The augmented reality display 360 may comprise the transparent display devices 255*a*, 255*b* of FIGS. 2A and 2B. The rendering engine 350 uses the output of the coordinate alignment engine, which is BIM data 342 and a pose 344 that are defined with respect to an intrinsic coordinate system based on one or more positioning systems used by the headset, to render the virtual images 352. This may comprise using one or more of projection, ray tracing, and rasterization as known in the art to provide an output for the augmented reality display 360 such that the BIM model appears as a virtual overlay over the user's view of the construction site.

The example system shown in FIG. 3 may operate iteratively to meet a desired frame rate, such as 30-90 Hz, such that the display of the virtual images 352 appears smooth to a user (e.g., as a video overlay). In certain cases, the first and second positioning systems 302, 304 may have different update rates for the generation of pose data 312, 314. For example, the second positioning system 304 may be slower than the first positioning system 302. In this case, the system transformation 324 may be used to generate available pose data in a common coordinate system and pose data generated at different update rates within this common coordinate system may be updated using known time series processing approaches.

In certain variations, eye tracking devices such 258*a*, 258*b* may be additionally used by the rendering engine 350 to determine any relative movement of the user's head relative to the hard hat 200. This relative movement may be tracked using the eye tracking devices such 258*a*, 258*b* to correct for any misalignment of the virtual images 352, e.g. via a correction of the pose data 344. In certain cases, tracking data from the eye tracking devices such 258*a*, 258*b* may be provided to the coordinate alignment engine 320 in addition to pose data from a plurality of positioning systems 302, 304 to make further corrections to a pose in an aggregate or common coordinate system. In certain cases, as described in WO2019/048866 A1, IMU 218 of FIG. 2B may be used to provide additional tracking data for the headset. It should be noted that the second positioning system described herein is provided in addition to the IMU 218, and while the IMU 218 may provide data to complement the tracking of the headset, it is not considered, on its own, to be a "positioning system" as used herein. Although two positioning systems are shown in the example of FIG. 3, any number of positioning systems may be combined in the manner described. Positioning systems may be modularly added and removed whilst still retaining a virtual view of the BIM.

In a preferred example, a first positioning system such as 302 comprises a higher precision or higher accuracy positioning system whereas a second positioning system such as 304 comprises a lower (i.e., relative to the first positioning system) precision or lower accuracy positioning system. For example, a first positioning system may be configured to track the headset within a tracked volume using one or more position-tracking sensors at least coupled to the headset (such as sensor devices 202*i* in FIGS. 2A and 2B) and one or more tracking devices for the tracked volume that are external to the headset within the construction site (such as base stations 102 in FIG. 1A). In this case, the at least one calibrated transformation 322 may be determined using sensor data obtained at control points for the first positioning system. As described above, this first positioning system may use electromagnetic radiation, such as optical, infra-red or laser beams, that is received by a plurality of position-tracking sensors on the hard hat and used to determine a first pose of the hard hat with (high) millimetre accuracy. Optical marker tracking systems may also provide similar functionality and accuracy. However, the first positioning system may be limited to a fixed area. There is thus a trade-off between accuracy and coverage. The second positioning system may comprise one or more sensor devices (such as camera 260) that are capable of tracking a host device (such as hard hat 200) in an area of an arbitrary size, i.e. an area that has a larger extent than the fixed area of the first positioning system. For example, SLAM systems that operate on video data may provide position and orientation data within an expanding area that is explored by the user. These second positioning systems may not have millimetre accuracy (e.g., they may have centimetre accuracy or larger) but may have a much larger range. Hence, using the series of transformations described herein to align different coordinate systems used by the different positioning systems allows a composite system that has high accuracy within fixed areas but that maintains tracking when the user exits those areas and/or when errors occur within the high accuracy system. In a comparative case, with a plurality of fixed areas using only a first positioning system, a user needs to deactivate the headset when exiting a first location and needs to reboot and recalibrate the headset when entering a second location. The second lower accuracy positioning system may comprise a camera-based system (including monocular camera cases, stereo camera cases, RGB-D camera cases, and camera+IMU cases) or radio frequency tracking systems, e.g. based on radio frequency identifiers (RFIDs) or tags that are mounted upon the hard hat.

In certain examples, one or more ancillary or secondary positioning systems may be used that provide lower precision but a wide or unlimited range. For example, a single camera tracking system is typically lower accuracy than a multi-beacon or optical-active-marker-based tracking system, e.g. as there may be fewer sensor devices with lower quality or resolution sensor data. However, these ancillary or secondary positioning systems may be reasonably cheap compared to a primary high accuracy positioning system. Using multiple positioning systems as described allows for correction of noisy data from infra-red or laser sensors forming part of a primary positioning system yet also accommodates rapid movements or interruptions in the ancillary or secondary positioning systems, providing a synergistic output that is greater than the two systems used independently. It also allows for incorrectly calibrated or positioned active or passive markers that are used in a higher accuracy tracked volume positioning system and for changing lighting or motion conditions which traditional camera-based tracking systems struggle with.

Example Method of Displaying BIM Data

Figure 4:
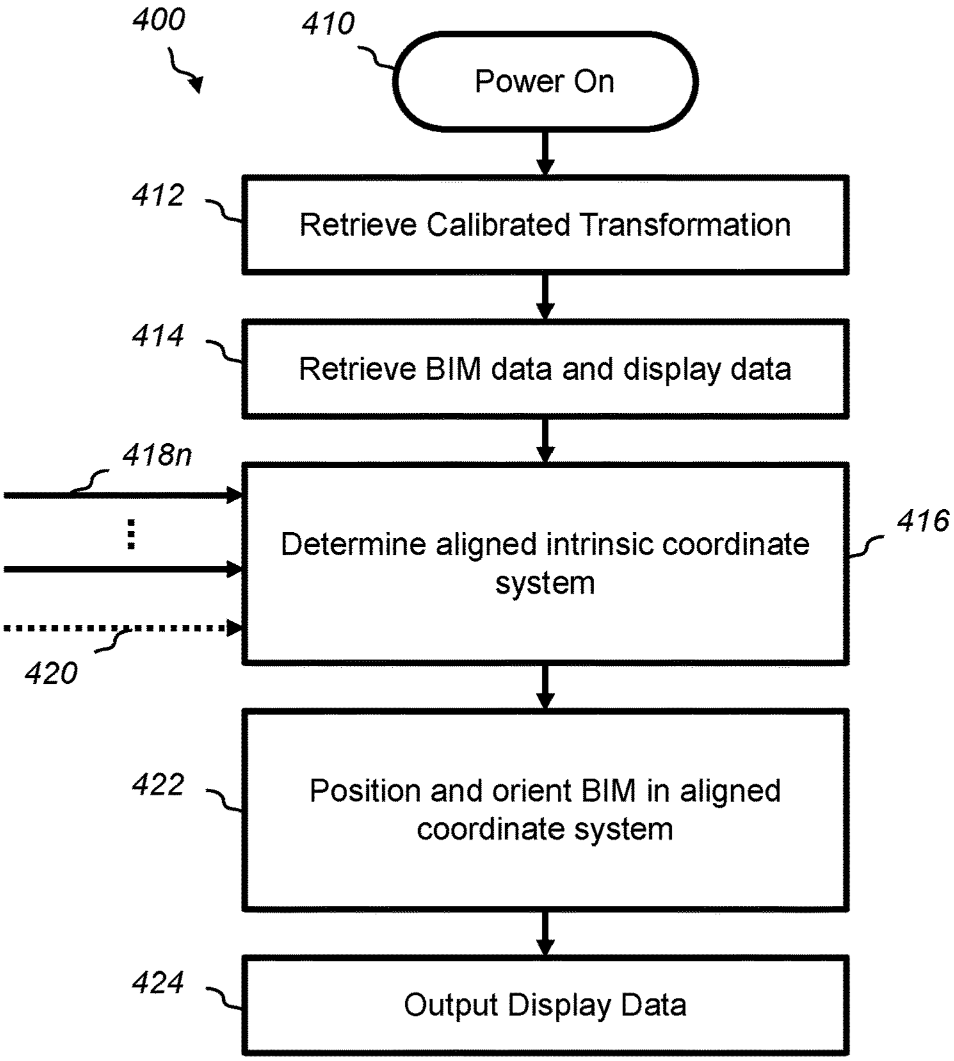
FIG. 4 is a flow chart showing a method of aligning multiple positioning systems to display BIM data in an augmented reality display.

FIG. 4 shows an example method 400 of displaying an augmented reality building information model within a head-mounted display of a headset on a construction site. The method may be used with examples of the first embodiment of the present invention that are described above, such as the hard hat 200 and augmented reality glasses 250 of FIG. 2A, wherein the electronic circuitry of FIG. 2B implements the example system 300 of FIG. 3. In one case, the method 400 may be performed by the example system 300 of FIG. 3; in other cases, the method 400 may be implemented by other suitably configured systems.

Turning to FIG. 4, the method begins with block 410 where the headset is switched on. This may comprise providing power from the one or more batteries 213, 273 shown in FIG. 2B. At block 412, at least one calibrated transformation is obtained that maps between at least one co-ordinate system of a plurality of positioning systems used by the headset and an extrinsic coordinate system used by the BIM. This calibrated transformation may comprise the calibrated transformation 322 of FIG. 3. The transformation may be calibrated based on a selected positioning system and may comprise the calibration using control points as described for the first positioning system 100 above. Other positioning systems may have other calibration routines to map a (local) coordinate system of the positioning system to a reference global or real-world coordinate system. At block 414, BIM data is retrieved along with any other display data that is needed to generate a virtual image for display on a head-mounted display of the headset. Block 414 may be performed by the model engine 330 of FIG. 3. Other display data may comprise data such as battery level, connectivity status, time, current user etc.

At block 416, an aligned intrinsic coordinate system is determined using tracking data 418*n* from a plurality (n) positioning systems, including the positioning system associated with the calibrated transformation retrieved at block 412. The tracking data 418*n* is derived by tracking the headset using the plurality of positioning systems, where each positioning system has a respective coordinate system and comprises one or more sensor devices coupled to the headset. Determining an aligned coordinate system may comprise obtaining a set of transformations that map between the co-ordinate systems of the plurality positioning systems and using the set of transformations to convert from one co-ordinate system to another. For example, one coordinate system may be selected as a primary coordinate system and this may comprise the coordinate system associated with the calibrated transformation retrieved in block 412. Tracking data in ancillary coordinate systems that are not the primary coordinate system may be converted to the primary coordinate system using transformations from the set of transformations that map from the ancillary coordinate systems to the primary coordinate system. In certain cases, there may be multiple primary coordinate systems and thus multiple calibrated transformations. In one case, the set of transformations are determined based on at least spatial relationships between the sensor devices of each positioning system with respect to the headset, e.g. known relative positions and orientations based on the rigid geometry of the headset. In these or other cases, the set of transformations may also be determined based on a non-linear optimisation of points mapped to a common coordinate system. In certain optional variations, block 416 may further comprise receiving eye-tracking data 420. This may be used to determine any relative movement between the headset and the user's head or eyes. This relative movement may be represented as a further transformation that is used to correct any tracking data mapped to the primary coordinate system. In certain cases, there may be no defined "primary" or "ancillary" coordinate system and a particular coordinate system for use may be determined based on available data. The set of transformations allow for mapping between different coordinate systems based on a series of matrix multiplications.

At block 422, the BIM data retrieved at block 414 is transformed to the aligned coordinate system so that it may be positioned and oriented relative to the position and orientation of the headset as determined from the processed tracking data following block 416. This may comprise obtaining a pose of the headset using positioning systems. The set of transformations and the at least one calibrated transformation are used to convert between the co-ordinate system of the pose and the extrinsic co-ordinate system used by the building information model. This allows the pose to be represented in the BIM space, or alternatively, the BIM space to be aligned to match the pose. This then allows the parts of the BIM that are visible from an object having the pose to be determined. At block 424, these parts of the BIM are used to generate one or more virtual images of the BIM that may then be output using a head-mounted display. For example, an image plane for the virtual image may be determined based on the pose and points within the three-dimensional BIM projected onto this image plane, allowing a user wearing the headset to view a correctly aligned augmented reality BIM.

Construction Site Zones

Figure 5:
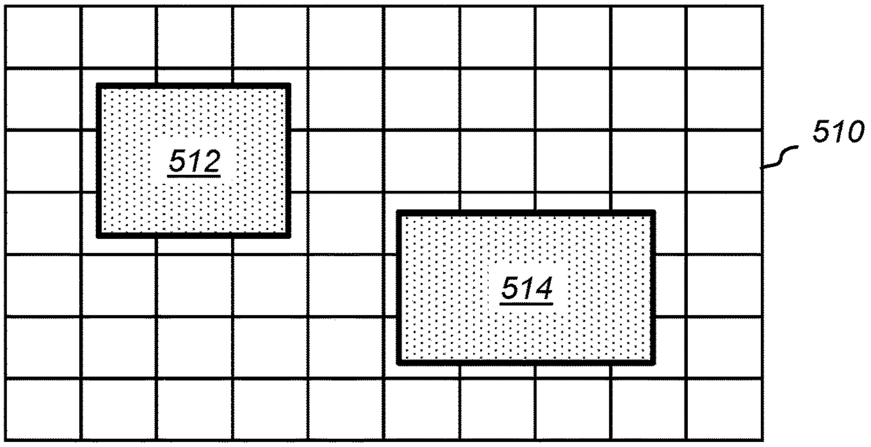
FIG. 5 is a schematic illustration showing multiple zones defined within a construction site according to an example.
Figure 6:
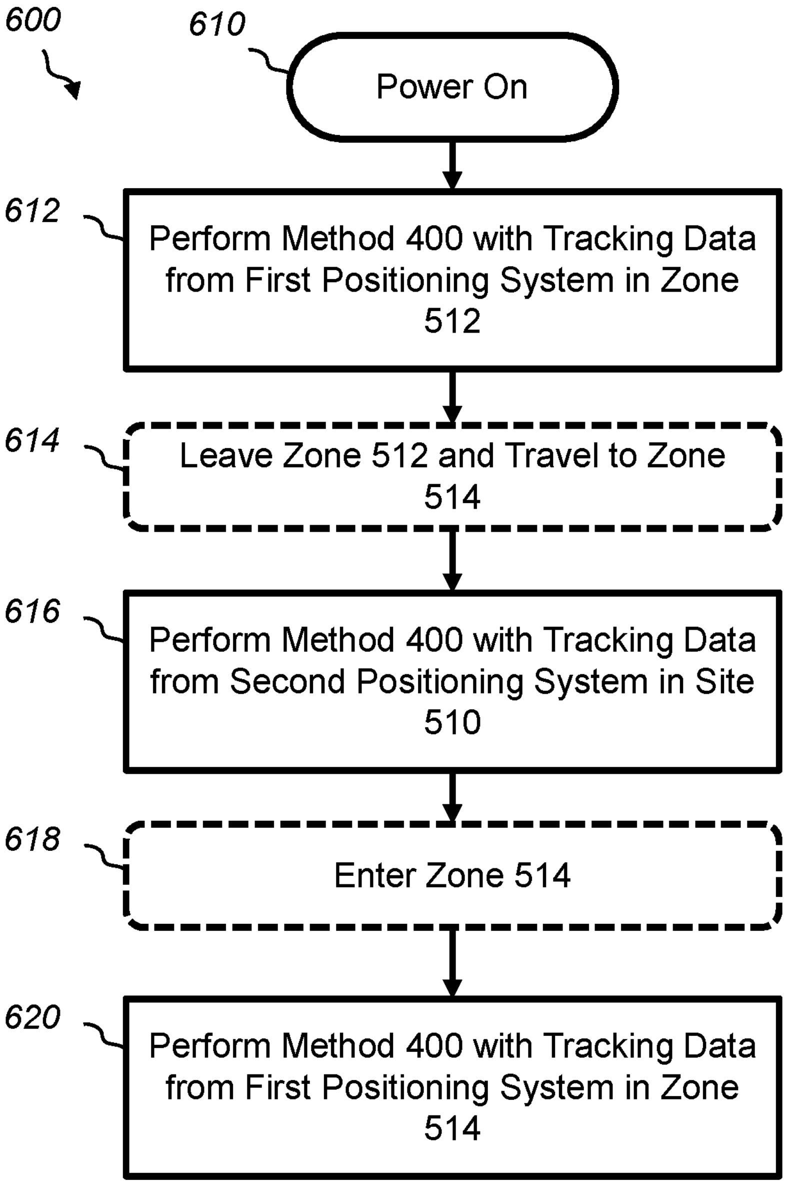
FIG. 6 is a flow chart showing a method of moving between the zones of the example of FIG. 5.

FIG. 5 shows a simplified example of a construction site with multiple zones. FIGS. 5 and 6 provide another example of how the first embodiment may be used within this context. The construction site comprises a first area 510 that represents (or is at least covered by) a range of a lower-accuracy positioning system, such as a camera-based (e.g., SLAM), RFID or WiFi-location positioning system. The construction site further comprises multiple zones 512, 514 within the first area 510. These may represent locations similar to the first location 1 of FIG. 1A, e.g. locations of buildings, floors, rooms or particular building portions on a wider construction site. Each of the multiple zones 512, 514 is equipped with a higher-accuracy positioning system that has a fixed range that is smaller than the extent of the first area 510. The higher-accuracy positioning system comprises a tracked volume within the smaller zones 512, 514 that is implemented using one or more tracking or beacon devices positioned around each smaller zone. The higher-accuracy positioning system may comprise the first positioning system 100 of FIG. 1A, e.g. a laser based system, or an active/passive marker system where the tracked volume is implemented using a plurality of camera devices that observe the tracked volume.

In use, a user, such as user 2*a*, 2*b* in FIG. 1A, navigates the construction site to perform jobs in different areas. For example, the user may comprise a construction engineer, foreman, contractor or other specialist that works at multiple locations within the construction site. In the present example, the user is tracked using one or more of the lower-accuracy and higher-accuracy positioning systems as they navigate the construction site. The user may be equipped with a headset, such as the hard hat 200 and augmented reality glasses 250 shown in FIGS. 2A and 2B or any other device that comprises sensor devices for the lower-accuracy and higher-accuracy positioning systems for tracking the user. For the higher-accuracy positioning systems in the smaller zones, one or more external tracking devices, such as beacons or cameras, are generally used. The sensor devices for the lower-accuracy and higher-accuracy positioning systems may be positioned on the headset or in relation to the user to allow the user's head and/or gaze to be determined (e.g., one possible example is shown in FIG. 2A). Tracked volumes for each of the smaller zones 512, 514 may be calibrated individually using the methods described above (e.g., measuring positions at control points). This may result in calibrated transformations for each of the smaller zones 512, 514 to maintain high (e.g., millimetre) accuracy within each smaller zone.

FIG. 6 shows a method 600 of navigating the areas shown in FIG. 5 using a tracking device configured according to the first embodiment. For sake of explanation, this example method assumes that the user starts within the first smaller zone 512 but it will be understood that similar methods may be performed with the user starting anywhere on the construction site.

At block 610, the user powers on a tracking device according to the first embodiment, such as the headset shown in FIGS. 2A and 2B. At block 612, as the user completes a task in the first smaller zone 512, the method 400 is performed using at least tracking data from the higher-accuracy positioning system. This may comprise determining a first pose of the headset using the sensor devices of the higher-accuracy positioning system as configured within the first smaller zone 512 and converting between the coordinate system for the higher-accuracy positioning system and an extrinsic coordinate system used by a BIM for the construction site using one of the calibrated transformations. The BIM may relate to the whole construction site or just to the area within the first smaller zone 512. In one case, a BIM may comprise multiple portions that are defined in a common extrinsic coordinate system yet may be split into portions that correspond to different entities under construction in different areas. Block 612 results in the rendering of a virtual image of the BIM (or a portion of a larger BIM) within a head-mounted display of the user, where the virtual image reflects the BIM as aligned relative to the first pose of the tracked user. In certain implementations, tracking data for the lower-accuracy positioning system may also be used while the user is within the first smaller zone 512. As described above with reference to at least FIG. 3, the tracking data for the lower-accuracy positioning system may be used to correct errors within the tracking data for the higher-accuracy positioning system that result from environmental factors or mispositioned sensors.

At block 614, the user leaves the first smaller zone 512 and heads towards the second smaller zone 514. In the present method, the user is able to maintain a view of the BIM and does not need to turn off a headset. Here, tracking may be maintained by using tracking data from the lower-accuracy positioning system. For example, as the user moves out of the tracked volume for the first smaller zone 512 a determination may be made as to whether the user or headset is tracked by the higher-accuracy positioning system. This may be made by a monitoring engine of an electronic control system of the headset, e.g. as implemented using the electronic circuitry of FIG. 2B. Responsive to a determination that the user or headset is not tracked by the higher-accuracy positioning system, block 616 is performed, whereby the method 400 of FIG. 4 is implemented, but this time using the tracking data from the lower-accuracy positioning system that covers the wider area 510. Block 616 may comprise determining a second pose of the headset using the lower-accuracy positioning system and converting between the coordinate system for the lower-accuracy positioning system and the extrinsic coordinate system used by the BIM using at least a transformation that maps between a coordinate system of the lower-accuracy positioning system and a coordinate system of the higher-accuracy coordinate system. This transformation may be determined based on a fixed or otherwise known relationship between sensor devices for the two positioning systems, e.g. based on the geometry of the sensor location on the headset, and/or determined by observing the space and minimising errors between representations in a common coordinate system. This may thus allow the pose of the user from the lower-accuracy positioning system to be represented in the same coordinate system used by the higher-accuracy positioning system. The BIM, or portions of the BIM, can thus continue to be converted to the intrinsic coordinate system of the higher-accuracy positioning system and rendered as before, only this time using the mapped pose from the lower-accuracy positioning system.

At block 618, the user arrives at, and enters, the second smaller zone 514. At block 620, a determination may again be made as to whether the user or headset is tracked by the higher-accuracy positioning system. For example, the monitoring engine described above may be implemented continuously or periodically. Response to a determination that the user or headset is tracked by the higher-accuracy positioning system, e.g. based on newly received signals by sensor devices 202*i* based on tracking devices implementing a tracked volume of the second smaller zone 514, the method 400 may then be performed with the higher-accuracy positioning system based on the tracked volume of the second smaller zone 514. For example, a calibrated transformation associated with the second smaller zone 514 may be retrieved and used to perform a transformation between the intrinsic coordinate system of the higher-accuracy positioning system and the extrinsic coordinate system of the BIM.

By using the examples of the first embodiment, the user wearing the headset perceives a smooth transition when travelling between smaller zones, e.g. from the first smaller zone 512 to the second smaller zone 514 in FIG. 5 and vice versa. For example, although the accuracy may vary when using different higher-accuracy and lower-accuracy positioning systems, this may be hidden from the user. For example, the user may just see a small icon or other indication within the augmented reality glasses 250 that shows they are operating in zones with different accuracies (e.g., similar to indications of network connectivity or network strength in a user interface of a mobile device). By using the tracking data from the lower-accuracy positioning system, the user may continue to view at least portions of the BIM on the head-mounted display when travelling around the construction site, without requiring the complexity or cost of large-scale tracked volumes or the inconvenience of having to reboot and recalibrate the headset when leaving and entering different zones. In certain implementations, the tracked volumes of the smaller zones may be arranged in areas of construction where tolerances are lower (i.e. where more precision is needed) such as internal rooms or building interiors/exteriors, and the wider-range lower-accuracy positioning system may be used in areas of construction where tolerances may be higher (i.e. where less precision is needed) such as pathways, exteriors, gardens etc. Moreover, there is the added bonus that the wider-range lower-accuracy positioning system also typically covers the smaller zones, so in the smaller zones it may be used as a backup or error correcting element of the higher-accuracy positioning system. The first embodiment thus enables seamless coverage of a large construction site, say of 500 by 500 metres, with reduced cost and complexity, while maintaining enough accuracy to use a virtual BIM view to complete the construction. Although the examples of FIGS. 5 and 6 have been described with reference to a higher-accuracy positioning system having multiple small zones of operation (i.e., 512 and 514), it is equally possible to have three or more positioning systems, e.g. two higher-accuracy positioning systems of differing technologies for the small zones of operation and one or more lower-accuracy positioning systems that cover the areas between the smaller zones. The same approaches are still applied.

The examples described herein, including both the first embodiment set out above and the second embodiment set out below, allow for the accurate alignment of different coordinate frames relating to heterogeneous positioning systems to further provide for accurate projection with respect to an information (extrinsic) coordinate system that provides for augmented reality images for viewing. Comparative systems offer expensive, high-accuracy, low-range positioning systems or cheaper, low-accuracy, high-range positioning systems, where each individually may be used to render an information model but that each require a trade-off between accuracy and range. Moreover, obtaining a workable system that optimises either accuracy or range, usually requires manufacturers of positioning systems to require bespoke hardware and software that is not interoperable with other positioning systems. This generally teaches away from combining positioning systems, as they are not built to be compatible and often have nuances that make them incompatible.

Although examples of low-accuracy and high-accuracy heterogeneous positioning systems are provided above, other examples may have any mixture of positioning systems, including mixtures of positioning systems using the same underlying approach. For example, the present invention may be applied to combine two different SLAM positioning systems, a SLAM positioning system and a RFID positioning system, a RFID positioning system and a WiFi positioning system, or two different tracked volume positioning systems covering overlapping tracked volumes. The flexibility of combinations is an advantage of the present approach.

Coordinate Alignment in a Second Embodiment

The first embodiment described above related to the use of multiple transformations to align and calibrate a plurality of positioning systems. The first embodiment was presented as a particular use case within a construction site, where the requirements for personal protective equipment and the need for accuracy in aligning a BIM model mean that the first embodiment has particular advantages. However, certain aspects of the present invention may also be applied in other contexts. The second embodiment present below shows how certain aspects of the present invention may be used to provide general improvements when tracking objects and providing augmented reality information.

Figure 7:
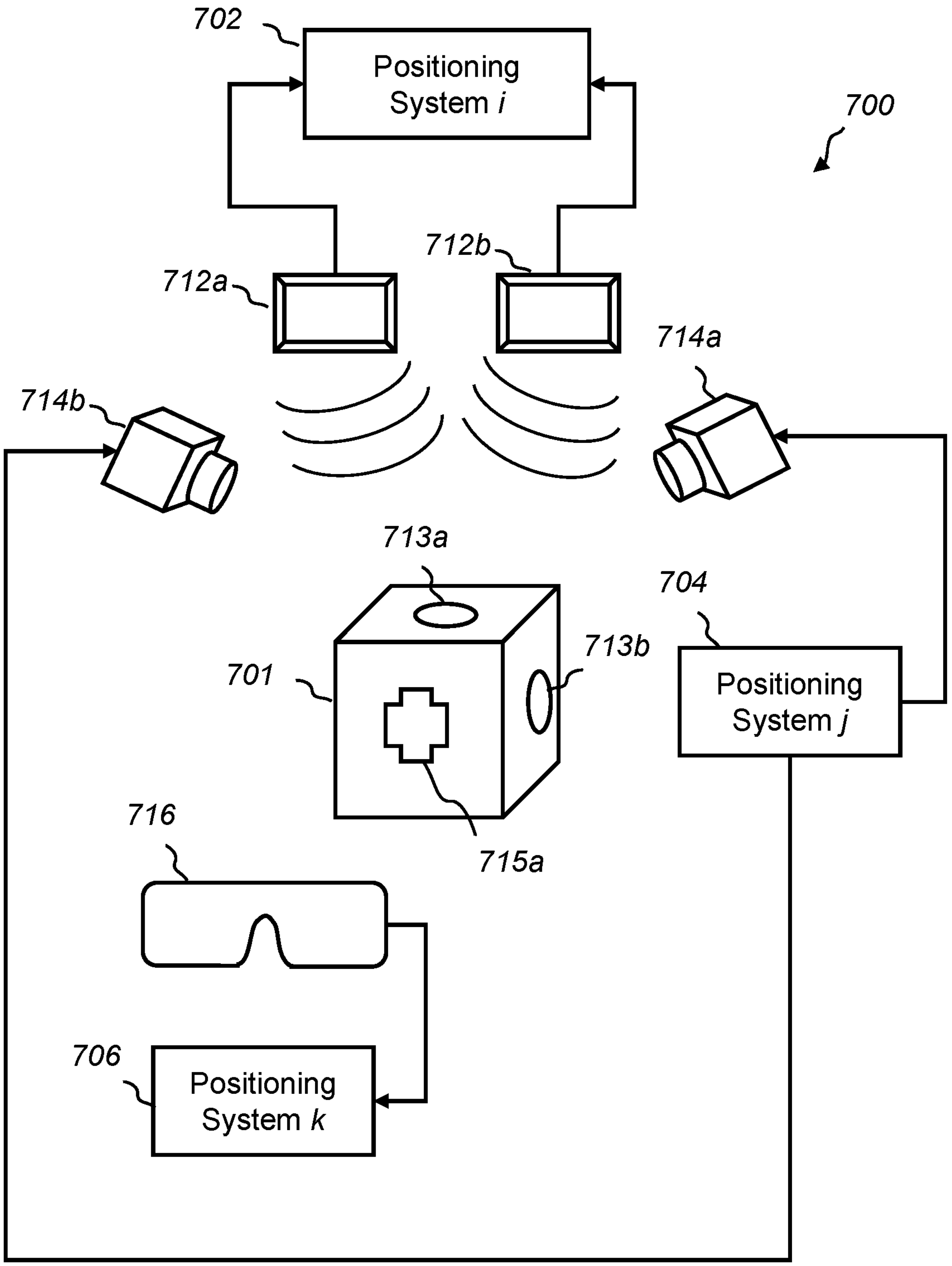
FIG. 7 is a schematic illustration showing multiple positioning systems being used to track an object according to a second embodiment of the present invention.

FIG. 7 shows a simplified example 700 where multiple positioning systems are used to track an object 701 within an environment. In FIG. 7, three positioning systems are shown: a first positioning system 702, a second positioning system 704 and a third positioning system 706. In implementations any plurality of positioning systems may be used, and the examples described herein also allow for the flexible additional or removable of positioning systems before or during use. The first positioning system 702 is shown as a laser or infra-red based tracking system that comprises one or more beacon devices 712 that emit electromagnetic radiation that is sensed by one or more sensor devices 713 mounted upon the object 701. The first positioning system 702 may track the object within a tracked volume or range determined by the one or more beacon devices 712. The first positioning system 702 may resemble the first positioning system 100 described above. Tracking the object may comprise determining a position and orientation of the object. The second positioning system 704 is shown as an optical marker-based tracking system wherein one or more camera devices 714 capture images of one or more active and/or passive markers 715 positioned upon the object. The one or more camera devices 714, of which two are shown in FIG. 7, may be greyscale cameras. In certain cases, the one or more camera devices 714 may also capture depth information and/or comprise event cameras. The one or more camera devices 714 send data to the second positioning system 704, which extracts at least a location of the marker 715. If multiple markers 715 are positioned on the object 701 then a position and orientation of the object 701 may be determined. Lastly, the third positioning system 706 comprises a headset or glasses-based positioning system. The third positioning system 706 comprises a viewing device 716 that comprises at least one camera rigidly attached to the viewing device 716. The third positioning system 706 may thus resemble the camera-based second positioning system described above. In use, a user wearing the viewing device 716 may track the object 701 using monocular or stereo SLAM methods. Each of the multiple positioning systems 702, 704, 706 may comprise known or off-the-shelf positioning systems. Indeed, one advantage of the present invention is that any combination of known positioning systems may be used with minimal change to those positioning systems, allowing positioning systems to be interchanged as technologies change and develop.

Figure 8:
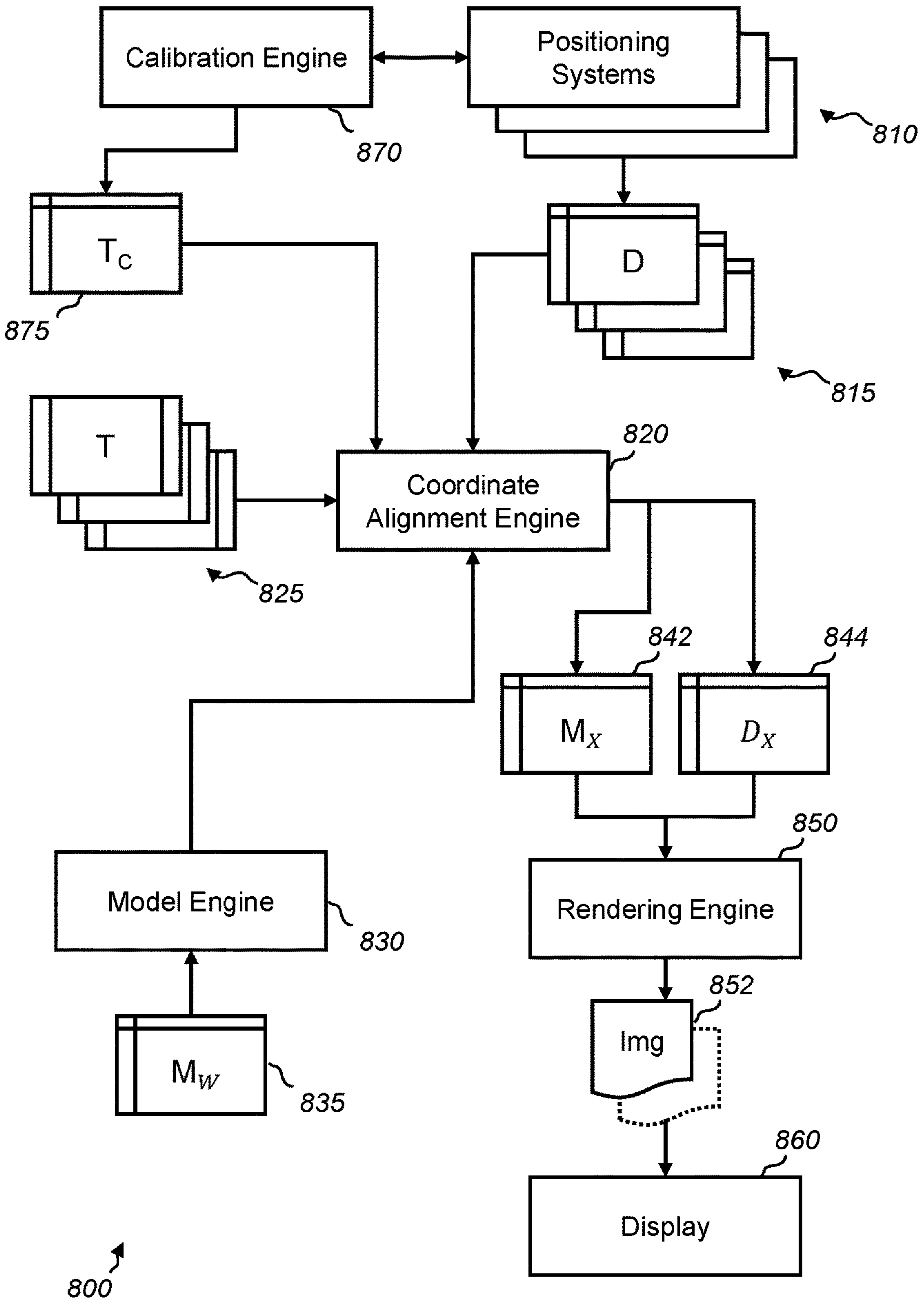
FIG. 8 is a system diagram showing use of a co-ordinate alignment engine to align the multiple positioning systems shown in FIG. 7 in accordance with the second embodiment of the present invention.

FIG. 8 shows an example system 800 for tracking an object using multiple positioning systems 810 according to the second embodiment. The example system 800 may be used to track the object 701 using the multiple positioning systems 702, 704, 706. The example of the second embodiment shown in FIG. 8 may be seen as a variation of the example of the first embodiment shown in FIG. 3 and, where not otherwise stated, features of the description of FIG. 3 also apply to corresponding features shown in FIG. 8. Similar to FIG. 3, the example system 800 of FIG. 8 comprises a coordinate alignment engine 820, a model engine 830, a rendering engine 850, a display 860 and a calibration engine 870. The plurality of positioning systems 810 each providing tracking data 815 for the object. This may comprise providing positions of defined points on the object (such as sensor or marker locations), such that a pose of the object may be determined, or providing one or more surface (e.g., plane) definitions for the object such that a position and orientation of at least one surface of the object may be determined. In all cases, the tracking data 815 is provided with respect to coordinate systems of each positioning system, i.e. the tracking data for any one positioning system is provided with respect to a frame of reference for that positioning system. The frame of reference may comprise a three-dimensional coordinate system with a defined origin (e.g., a zero point with three orthogonal basis vectors within the three dimensions). A position in a coordinate system may be defined as a triple (x, y, z) indicating proportions of each of the orthogonal basis vectors. Geometric structures such as lines and planes may be defined using a series of points or using equations that associate the coordinates as is known in the art.

In FIG. 8, the tracking data is received by the coordinate alignment engine 820. The coordinate alignment engine 820 is configured to align the coordinate systems of the plurality of positioning systems 810 such that an object position and/or orientation may be defined within an aligned coordinate system and referenced to information provided in, or also aligned to, the aligned coordinate system. To do this the coordinate alignment engine 820 accesses a set of transformations 825 that map between the coordinate systems of the positioning systems. In FIG. 8, the model engine 830 accesses model data 835, which is defined relative to a fixed or world (w) coordinate system. This world coordinate system may be a reference coordinate system for the definition of information that needs to be spatially associated with a position and/or orientation of the object, e.g. so the information may be displayed on an augmented reality display, a conventional 2D display, or on a 3D holographic display. The world coordinate system is typically also a 3D coordinate system with a defined origin. In the example system of FIG. 8, the model engine 830 provides the model data 835 to the coordinate alignment engine 820 for alignment to the tracking data 815 from the multiple positioning systems 810. Model data 835 may comprise information such as characteristics of the object, reference information, visualisation layers etc.

In FIG. 8, the coordinate alignment engine 820 uses the set of transformations 825 to output one or more of model data 842 and tracking data 844 that is aligned to a common or single coordinate system (shown as X). This common coordinate system may comprise a selected coordinate system of the positioning systems, such as a primary coordinate system with a highest accuracy, or the world coordinate system of the original model data 835. It will be noted that in the latter case, no alignment of the original model data 835 may be required as it is already within the world coordinate system; the aligned model data 842 may comprise the original model data 835. In this case, it is the output tracking data 844 that is aligned to the world coordinate system. This may be the case, if the pose of the object is to be displayed with reference to the world coordinate system, e.g. on a 2D computer screen or 3D holographic display. In a case, where the common coordinate system is not the world coordinate system, then both the output model data 842 and the tracking data 844 may be mapped to the common coordinate system. In one case, mapping the tracking data 815 to the common coordinate system may result in duplicate tracking data for one or more locations or geometric features of the object. In this case, preference may be given to higher-accuracy positioning systems or statistical distributions of the tracking data across the multiple positioning systems may be used to determine a single position and/or orientation, such as a mean position weighted by an accuracy measure and/or exclusion of locations that are unlikely given a probability distribution based on the tracking data from the multiple systems. In certain cases, the tracking data 815 may be collected over time, such that a trajectory representing a collection of poses over time is collected. In this case, the mapped tracking data 844 may comprise a distribution of possible locations for a common point and these may be fused using a temporal (accuracy-weighted) average or other statistical measure.

In the example of FIG. 8, the output model data 842 and output tracking data 844, that are provided with respect to the common coordinate system, are used by the rendering engine 850 to generate images that feature the tracked object and the model data 835. In one case, these may comprise images derived from the model data 825 overlaid over the object which are viewable on the display 860. For example, the images may comprise graphics that are overlaid over a rendering of the object, both being defined based on the common coordinate system using known 3D graphic rendering techniques. In another case, similar to the first embodiment, they may comprise images constructed from the model data that are displayed on virtual or augmented reality glasses, such as the viewing device 716, where the viewing device 716 incorporates the display. In other implementations, at least the aligned tracking data may be used on its own (e.g., without the model engine 830, rendering engine 850 or display 860). For example, the aligned tracking data may be used to track the object within a control process.

Returning to the coordinate alignment engine 820, the set of transformations 825 may comprise a series of matrix transformations that include rotation and translation terms that map an origin of one coordinate system to an origin of another coordinate system. Each transformation may map between two defined coordinate systems relating to two respective positioning systems. For any two positioning systems, one or two transformations may be defined, depending on the direction of mapping that is required. In one case, the two transformations may comprise a forward transformation (e.g., from positioning system i to positioning system j) and a backward transformation (e.g., from positioning system j to positioning system i), where the backward transformation may comprise an inverse of the forward transformation. In one case, the set of transformations may be defined starting from known fixed spatial relationships between the sensor devices of the positioning systems, such as the know distances and relative positioning of the sensors 713 and the marker 715*a* shown in FIG. 7. In another or an advanced case, the set of transformations may be determined during a calibration procedure where one or more control points on the object are located with all the positioning systems and are then compared to determine the transformations between positioning systems. In this latter case, initial values of transformations may be based on known geometries.

FIG. 8 also shows the calibration engine 870. The calibration engine 870 is shown determining at least one calibrated transformation 875 based on tracking data from at least one or the plurality of positioning systems 810. The at least one calibrated transformation 875 is used to map between at least one of the coordinate systems of the plurality of positioning systems 810 and the world coordinate system of the model data 835. This may be performed by determining the location of fixed control points in the world coordinate system within the coordinate systems of one or more of the plurality of positioning systems 810. For example, the object 701 may be placed in a series of defined points within an environment that have known locations within the world coordinate system and tracking data at those points may be used to determine corresponding points within the coordinate system of one or more positioning systems, thus allowing the transformation between the points in the two coordinate systems to be determined. In preferred examples, only one calibrated transformation (or a small number) may be used for a large number of positioning systems 810. This can significantly improve the calibration process. For example, the calibrated transformation 875 may be determined for a primary, high-accuracy positioning system and then the tracking data for other positioning systems may be mapped to the coordinate system for this primary positioning system using the set of transformations 825, rather than requiring a calibrated transformation for each separate positioning system.

Figure 9:
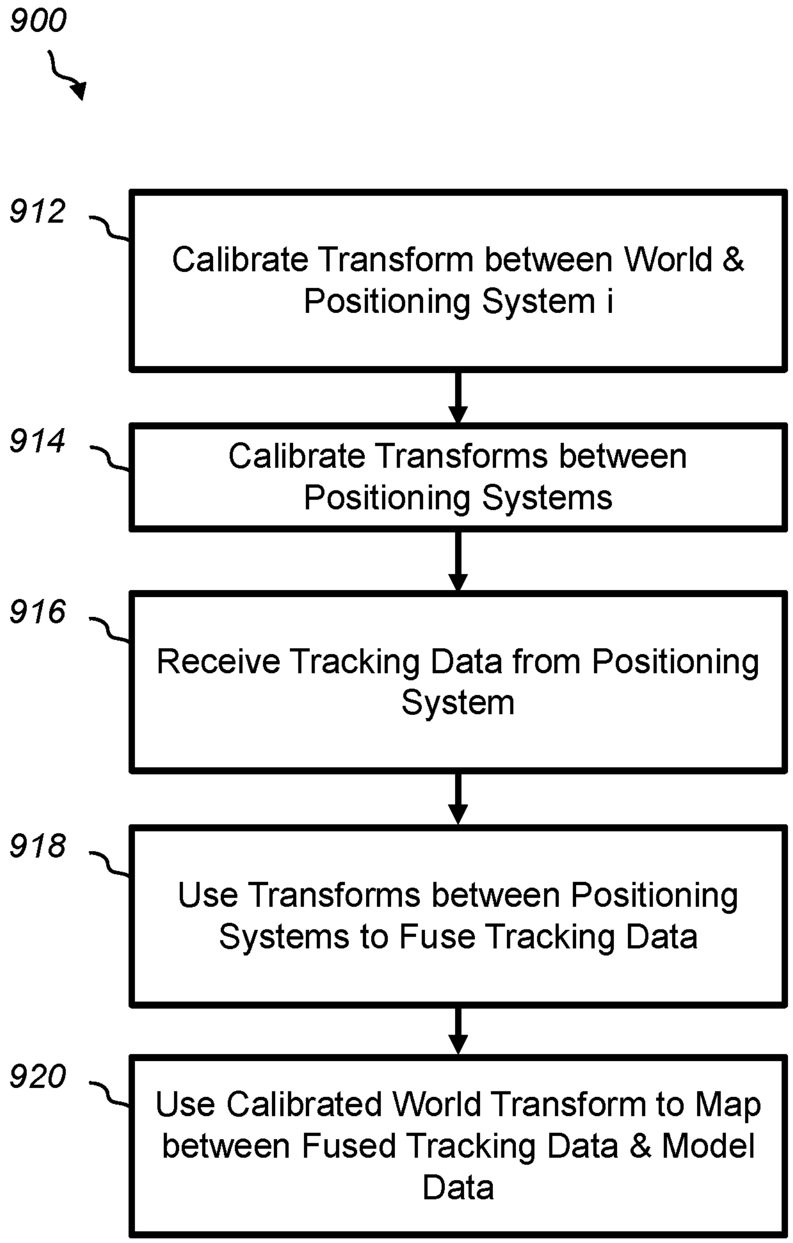
FIG. 9 is a flow chart showing a method of aligning multiple positioning systems in accordance with the second embodiment of the present invention.

FIG. 9 shows a method 900 of tracking an object with respect to a reference (world) coordinate system. This method may be performed using the example system 800 of FIG. 8. The method may be stored as a set of instructions within a non-transitory computer storage medium, where the method may be implemented by loaded the instructions into memory and executing the instructions with one or more processing units (e.g., in a similar manner to the process described for the electronic circuitry of FIG. 2B).

At block 912, a transformation between the reference coordinate system and one of the positioning systems (in this example, a positioning system i) is determined. This may be performed as described above (e.g., with respect to calibrated transformation 875) and/or with reference to the first embodiment. The transformation may be determined as part of a known calibration procedure for a positioning system, and the calibration may vary between positioning systems while still producing a common matrix transformation as output. At block 914, transformations between the positioning systems are determined. These transformations may comprise at least forward transformations between each positioning system and the positioning system used at block 912 (e.g., system i). As described above and with reference to the first embodiment, these transformations may be defined based on known spatial relationships between sensor devices for the positioning systems and/or based on measurements with the sensor devices of the positioning systems of common points within the environment.

Blocks 912 and 914 may be performed once as part of an initial calibration stage. Blocks 916 to 920 then reflect tracking operations that are performed repeatedly in use. At block 916, tracking data is received from one or more of the plurality of positioning systems (e.g., as tracking data 815 from positioning systems 810). As described with reference to the first embodiment, not all of the positioning systems need to be operational or providing data, as the alignment described herein allows for duplicate data to be mapped to a common coordinate system. As block 918, the transformations determined at blocks 912 and 914, i.e. the at least one calibrated transformation and the set of transformations for the positioning systems, are used to fuse the tracking data received at block 916 into a common coordinate system. In particular, this may comprise mapping tracking data from a plurality of ancillary positioning systems to the coordinate system of a primary positioning system using the transformations calibrated at block 914. Block 920 then comprises a further mapping between the tracking data now mapped (or present in) the coordinate system of the primary positioning system to the reference coordinate system using the calibrated transformation determined at block 912. In this manner, model data that is defined in the reference coordinate system, such as CAD files with 3D models defined with respect to an origin of the CAD application or file, may be associated with the fused tracking data, as all locations are now defined with reference to a shared coordinate system.

In accordance with an unclaimed aspect of the second embodiment, a method may comprise the following operations. In a first operation, obtaining, at a processor, tracking information for an object from a plurality of positioning systems, the tracking information for each positioning system within the plurality of positioning systems being defined in relation to a corresponding coordinate system. In a second operation, obtaining, at the processor, a set of transformations that map between the coordinate systems of the plurality positioning systems. In one variation, the set of transformations may be based on, or initialised using, spatial relationships between sensor devices for the plurality of positioning systems that are mounted upon the object. In a third operation, obtaining, at the processor, at least one calibrated transformation that maps between at least one of the coordinate systems of the plurality of positioning systems and an extrinsic coordinate system used by an information model of the environment. And in a fourth operation, using the set of transformations and the at least one calibrated transformation, converting, at the processor, between the co-ordinate systems of the tracking information and the extrinsic co-ordinate system used by the information model.

The object may comprise a mobile computing device with a display. In this case, the method may comprise rendering an augmented reality display of the information model on the display of the computing device. Each transformation comprises a multi-dimensional array having rotation and translation terms. The mobile computing device may comprise a smartphone, tablet, drone or other autonomous device.

The converting, at the processor, between the co-ordinate systems of the tracking information and the extrinsic co-ordinate system used by the information model may comprise the following operations. First, determining a first set of points in the extrinsic co-ordinate system by applying the at least one calibrated transformation to a set of points in a first co-ordinate system for a first positioning system within the plurality of positioning systems. Then, determining a second set of points in the extrinsic co-ordinate system by: applying one of the set of transformations to a set of points in a second co-ordinate system for a second positioning system within the plurality of positioning systems to output a corresponding set of points in the first co-ordinate system, and applying the at least one calibrated transformation to the corresponding set of points in the first co-ordinate system to determine the second set of points in the extrinsic co-ordinate system.

A method of calibrating a plurality of positioning systems may also be provided according to another unclaimed aspect. This may comprise: obtaining control point location data representing the positions of a plurality of control points within an extrinsic co-ordinate system for the environment; obtaining measurements of the plurality of control points using one or more sensor devices of a plurality of positioning systems; using the measurements, representing the plurality of control points within respective intrinsic co-ordinate systems for the plurality of positioning systems; and comparing the positions of the control points in the co-ordinate systems to derive respective transformations between the co-ordinate systems.

The above aspects and variations may be adapted using any of the features described above with respect to one or more of the examples of the first and second embodiments.

If not explicitly stated, all of the publications referenced in this document are herein incorporated by reference. The above examples and embodiments are to be understood as illustrative. Further examples and embodiments are envisaged. Although certain components of each example and embodiment have been separately described, it is to be understood that functionality described with reference to one example or and embodiment may be suitably implemented in another example or and embodiment, and that certain components may be omitted depending on the implementation. It is to be understood that any feature described in relation to any one example or and embodiment may be used alone, or in combination with other features described, and may also be used in combination with one or more features of any other of the examples or and embodiments, or any combination of any other of the examples or and embodiments. For example, features described with respect to the system components may also be adapted to be performed as part of the described methods. Furthermore, equivalents and modifications not described above may also be employed without departing from the scope of the invention, which is defined in the accompanying claims.

The invention claimed is:

1. A computer-implemented method of displaying an augmented reality building information model within a head-mounted display of a headset, the method comprising:

tracking the headset using a plurality of different positioning systems, each positioning system having a corresponding different coordinate system that further differs from an extrinsic coordinate system used by the building information model and comprising one or more sensor devices coupled to the headset, each positioning system determining a location and orientation of the headset over time within the corresponding coordinate system;

obtaining a set of transformations that map between the co-ordinate systems of the plurality of positioning systems;

obtaining at least one calibrated transformation that maps between a first co-ordinate system associated with a corresponding first positioning system of the plurality of positioning systems and the extrinsic coordinate system used by the building information model, the first positioning system having a first tracked volume;

obtaining a first pose of the headset using the first positioning system and rendering an augmented reality image of the building information model within the head-mounted display relative to the first pose of the headset using the at least one calibrated transformation;

responsive to a determination that the headset is not tracked by the first positioning system, transitioning from tracking the headset using the first positioning system to tracking the headset using a second one of the plurality of positioning system of the plurality of positioning systems responsive to movement of the headset within a construction site, the second positioning system having a second tracked volume with a range extending beyond a range of the first tracked volume;

obtaining a second pose of the headset using the second positioning system, the second pose of the headset being defined within a corresponding second one of the co-ordinate systems, the second pose of the headset comprising a location and orientation of the headset;

using the set of transformations and the at least one calibrated transformation to convert between the second one of the co-ordinate systems used to define the second pose and the extrinsic co-ordinate system used by the building information model by mapping the second pose between the second one of the co-ordinate systems, associated with the second positioning system, and the first one of the co-ordinate systems, associated with the first positioning system, and applying the at least one calibrated transformation; and rendering an augmented reality image of the building information model within the head-mounted display relative to the second pose.

2. The method of claim 1, wherein the first positioning system tracks the first pose of the headset and the second positioning system tracks the second pose of the headset, wherein the at least one calibrated transformation is used to align the building information model with at least one of the poses to render the augmented reality image, and wherein one of the set of transformations is used to align the co-ordinate systems of the plurality of positioning systems.

3. The method of claim 1, wherein said transitioning further comprises:

tracking the headset over time with the first positioning system, including performing a first mapping between the first pose in the first co-ordinate system and the extrinsic co-ordinate system used by the building information model using the at least one calibrated transformation;

rendering the augmented reality image of the building information model within the head-mounted display using the first mapping;

transitioning to tracking the headset over time with the second positioning system, including performing a second mapping between the second pose in the second co-ordinate system and the extrinsic co-ordinate system used by the building information model; and rendering the augmented reality image of the building information model within the head-mounted display using the second mapping, wherein the second mapping uses one of the set of transformations to map between the first and second co-ordinate systems and the at least one calibrated transformation to align the location and orientation of the headset with the extrinsic coordinate system.

4. The method of claim 1, wherein the plurality of positioning systems differ by one or more of:

sensor devices used to track the headset;

method of positioning; and location of use.

5. The method of claim 1, wherein the first positioning system within the plurality of positioning systems is configured to track the headset within the first tracked volume using one or more position-tracking sensors at least coupled to the headset and one or more tracking devices for the first tracked volume that are external to the headset within the construction site, wherein the at least one calibrated transformation is determined using sensor data obtained at control points for the first positioning system.

6. The method of claim 5, wherein the method further comprises:

determining the first pose of the headset using the first positioning system;

converting between the coordinate system for the first positioning system and the extrinsic coordinate system used by the building information model using the at least one calibrated transformation and rendering the augmented reality image of the building information model within the head-mounted display relative to the first pose of the headset;

responsive to the determination that the headset is not tracked by the first positioning system, determining the second pose of the headset using a second positioning system configured to track the headset using one or more camera devices at least coupled to the headset; and converting between the coordinate system for the second positioning system and the extrinsic coordinate system used by the building information model using the set of transformations and the at least one calibrated transformation, and rendering the augmented reality image of the building information model within the head-mounted display relative to the second pose of the headset.

7. The method of claim 6, wherein the one or more tracking devices for the tracked volume form a first set of tracking devices located at a first location within the construction site, the first set of tracking devices define the first tracked volume, and wherein the construction site further comprises a second location that is geographically separated from the first location, the second location comprising a second set of tracking devices defining the second tracked volume, wherein the method further comprises:

rendering the augmented reality image of the building information model within the head-mounted display relative to the second pose of the headset during movement of the headset between the first and second locations of the construction site;

responsive to entering the second tracked volume, determining a third pose of the headset using signals received from the second set of tracking devices;

converting between the coordinate system for the first positioning system and the extrinsic coordinate system used by the building information model using one or more of:

the at least one calibrated transformation, and a further transformation calibrated using sensor data obtained at control points within the second tracked volume for the first positioning system; and rendering the augmented reality image of the building information model within the head-mounted display relative to the third pose of the headset.

8. The method of claim 1, wherein the positioning systems in the plurality of positioning systems have different ranges and accuracies and include at least the first positioning system with a first range and a first accuracy, and the second positioning system with a second range and a second accuracy, the first accuracy being greater than the second accuracy.

9. The method of claim 8, wherein the second positioning system comprises a simultaneous location and mapping (SLAM) system that receives image data from one or more camera devices.

10. The method of claim 1, wherein the one or more tracking devices of the first positioning system emit one or more electromagnetic signals, and at least one of the one or more position-tracking sensors is configured to determine a property of the electromagnetic signals that is indicative of an angular distance from the one or more tracking devices.

11. The method of claim 1, the method further comprising, prior to tracking the headset, calibrating the first tracked volume of the first positioning system in the plurality of positioning systems, wherein the calibration includes:

receiving control point location data representing the positions of a plurality of control points at the construction site in the extrinsic coordinate system;

receiving control point tracking data representing the positions of the control points in an intrinsic coordinate system used by the first positioning system; and relating the positions of the control points in the intrinsic and extrinsic coordinate systems to derive the at least one calibrated transformation, wherein the set of transformations map between the intrinsic co-ordinate system used by the first positioning system and one or more intrinsic coordinate systems used by other positioning systems within the plurality of positioning systems.

12. The method of claim 1, the method further comprising:

determining a first set of points in the extrinsic coordinate system by applying the at least one calibrated transformation to a set of points in a coordinate system for the first positioning system within the plurality of positioning systems;

determining a second set of points in the extrinsic coordinate system determined by applying the at least one calibrated transformation and one of the set of transformations to a set of points in a coordinate system for the second positioning system within the plurality of positioning systems; and fusing the two sets of points in the extrinsic co-ordinate system to determine a single set of points in the extrinsic co-ordinate system for the rendering of the building information model.

13. The method of claim 1, the method further comprising:

measuring a position of a plurality of defined points with each of the plurality of positioning systems; and comparing the measured positions to calibrate the set of transformations, wherein comparing the measured positions comprises optimising a non-linear function representing a difference between positions of the one or more defined points as obtained from two or more coordinate systems of two or more different positioning systems.

14. The method of claim 1, wherein the plurality of positioning systems includes at least two selected from:

a radio-frequency identifier (RFID) tracking system comprising at least one RFID sensor coupled to the headset;

an inside-out positioning system comprising one or more signal-emitting beacon devices external to the headset and one or more receiving sensors coupled to the headset;

a global positioning system;

a positioning system implemented using a wireless network and one or more network receivers coupled to the headset; or a camera-based simultaneous location and mapping (SLAM) system.

15. A headset for use in construction, the headset comprising:

an article of headwear;

sensor devices for a plurality of different positioning systems, each positioning system having a corresponding different coordinate system that further differs from an extrinsic coordinate system used by a building information model, each positioning system determining a location and orientation of the headset over time within the corresponding coordinate system;

a head-mounted display for displaying an augmented reality image of the building information model; and an electronic control system comprising at least one processor to:

obtain a set of transformations that map between the coordinate systems of the plurality of positioning systems;

obtain at least one calibrated transformation that maps between a first coordinate system associated with a corresponding first positioning system of the plurality of positioning systems and the extrinsic coordinate system used by the building information model, the first positioning system having a first tracked volume;

obtain a first pose of the headset using the first positioning system and render an augmented reality image of the building information model within the head-mounted display relative to the pose of the headset using the at least one calibrated transformation;

responsive to a determination that the headset is not tracked by the first positioning system, transition from tracking the headset using the first positioning system to tracking the headset using a second positioning system of the plurality of positioning systems responsive to movement of the headset within a construction site, the second positioning system having a second tracked volume with a range extending beyond a range of the first tracked volume;

obtain a second pose of the headset using the second positioning system, the second pose of the headset being defined within a corresponding second one of the coordinate systems, the second pose of the headset comprising a location and orientation of the headset; and use the set of transformations and the at least one calibrated transformation to convert between the second one of the coordinate systems used to define the second pose and the extrinsic coordinate system used by the building information model, by mapping the obtained pose between the second one of the coordinate systems, associated with the second positioning system, and the first one of the coordinate systems, associated with the first positioning system, and applying the at least one calibrated transformation, to render an augmented reality image of the building information model relative to the second pose of the article of headwear on the head-mounted display.

16. The headset of claim 15, wherein the first positioning system tracks the first pose of the headset and the second positioning system tracks the second pose of the headset, wherein the at least one calibrated transformation is used to align the building information model with at least one of the poses to render the augmented reality image, and wherein one of the set of transformations is used to align the co-ordinate systems of the plurality of positioning systems.

17. The headset of claim 15, wherein the sensor devices comprise:

one or more position-tracking sensors mounted in relation to the article of headwear that are responsive to one or more electromagnetic signals emitted by the first positioning system within the plurality of positioning systems, the first positioning system comprising one or more tracking devices for implementing the first tracked volume that are external to the headset within the construction site; and one or more camera devices mounted in relation to the article of headwear to generate data for use by the second positioning system within the plurality of positioning systems.

18. The headset of claim 15, wherein the article of headwear comprises a hard-hat.

19. A non-transitory computer-readable storage medium storing instructions which, when executed by at least one processor, cause the at least one processor to:

track a headset using a plurality of different positioning systems, each positioning system having a corresponding different co-ordinate system that further differs from an extrinsic co-ordinate system used by a building information model and comprising one or more sensor devices coupled to the headset, each positioning system determining a location and orientation of the headset over time within the corresponding coordinate system;

obtain a set of transformations that map between the co-ordinate systems of the plurality of positioning systems;

obtain at least one calibrated transformation that maps between a first coordinate system associated with a corresponding first positioning system of the plurality of positioning systems and the extrinsic coordinate system used by the building information model, the first positioning system having a first tracked volume;

obtain a first pose of the headset using the first positioning system and render an augmented reality image of the building information model within the head-mounted display relative to the first pose of the headset using the at least one calibrated transformation;

responsive to a determination that the headset is not tracked by the first positioning system, transition from tracking the headset using the first positioning system to tracking the headset using a second positioning system of the plurality of positioning systems responsive to movement of the headset within a construction site, the second positioning system having a second tracked volume with a range extending beyond a range of the first tracked volume;

obtain a second pose of the headset using the second positioning system, the second pose of the headset being defined within a corresponding second one of the co-ordinate systems, the second pose of the headset comprising a location and orientation of the headset; and use the set of transformations and the at least one calibrated transformation, to convert between the second one of the co-ordinate systems used to define the second pose and the extrinsic co-ordinate system used by the building information model by mapping the second pose between the second one of the co-ordinate systems, associated with the second positioning system, and the first one of the co-ordinate systems, associated with the first positioning system, and applying the at least one calibrated transformation; and rendering an augmented reality image of the building information model within the head-mounted display relative to the second pose.

* * * * *